US012445550B2

(12) United States Patent
Baek et al.

(10) Patent No.: US 12,445,550 B2
(45) Date of Patent: Oct. 14, 2025

(54) ELECTRONIC DEVICE PROVIDING USER INTERFACE

(71) Applicant: Samsung Electronics Co., Ltd., Suwon-si (KR)

(72) Inventors: Jiwon Baek, Suwon-si (KR); Younghak Oh, Suwon-si (KR); Eunah Lee, Suwon-si (KR); Kyuok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 18/296,638

(22) Filed: Apr. 6, 2023

(65) Prior Publication Data

US 2023/0247129 A1    Aug. 3, 2023

Related U.S. Application Data

(63) Continuation of application No. PCT/KR2021/014428, filed on Oct. 18, 2021.

(30) Foreign Application Priority Data

Oct. 26, 2020   (KR) .................. 10-2020-0139599

(51) Int. Cl.
*H04M 1/72454*   (2021.01)
*G06F 1/16*   (2006.01)
(Continued)

(52) U.S. Cl.
CPC ...... *H04M 1/72454* (2021.01); *G06F 1/1624* (2013.01); *G06F 1/1652* (2013.01);
(Continued)

(58) Field of Classification Search
CPC combination set(s) only.
See application file for complete search history.

(56) References Cited

U.S. PATENT DOCUMENTS 9,648,062 B2 *   5/2017   Chaudhri ............ G06F 3/04886
9,691,321 B2     6/2017   Eom
(Continued)

FOREIGN PATENT DOCUMENTS

JP           5423362 B2      2/2014
KR      10-1401271 A         5/2014
(Continued)

OTHER PUBLICATIONS

Korean Office Action dated May 1, 2025, issued in Korean Application No. 10-2020-0139599.

*Primary Examiner* — Lisa Lea-Edmonds
(74) *Attorney, Agent, or Firm* — Jefferson IP Law, LLP

(57) ABSTRACT

An electronic device is provided. The electronic device includes a flexible display and at least one processor. The at least one processor can display a first execution screen of a first application in a first area of the flexible display, display a second execution screen of a second application in a second area sharing at least one edge with the first area, obtain a pre-defined event associated with the second application, in response to the pre-defined event, change the second execution screen displayed in the second area to a low power mode while maintaining the first execution screen in the first area, and while the second execution screen is in the low power mode, output some selected content in the second execution screen of the second application in consideration of at least one of a type or the properties of the second application.

20 Claims, 19 Drawing Sheets

(51) Int. Cl.
*G06F 3/0488* (2022.01)
*H04M 1/02* (2006.01)
(52) U.S. Cl.
CPC ........ *G06F 3/0488* (2013.01); *H04M 1/0235* (2013.01); *H04M 1/0268* (2013.01); *G06F 2200/1632* (2013.01); *H04M 2201/38* (2013.01)

(56) References Cited

U.S. PATENT DOCUMENTS

| | | | | |
|---|---|---|---|---|
| 9,891,965 | B2* | 2/2018 | Hong | G06F 3/04886 |
| 9,971,712 | B2* | 5/2018 | Oh | G06F 1/1641 |
| 10,133,310 | B2* | 11/2018 | Kim | G06F 3/147 |
| 10,209,766 | B2 | 2/2019 | Han et al. | |
| 10,254,863 | B2 | 4/2019 | Shin et al. | |
| 10,261,573 | B2 | 4/2019 | Sunwoo et al. | |
| 10,310,866 | B2* | 6/2019 | Jung | G06F 9/4403 |
| 10,466,856 | B2* | 11/2019 | Shin | G06F 3/0482 |
| 10,504,481 | B2* | 12/2019 | Kim | G06F 1/3262 |
| 10,911,586 | B2 | 2/2021 | Kim et al. | |
| 10,990,208 | B2* | 4/2021 | Jung | H04M 1/0235 |
| 11,093,203 | B2* | 8/2021 | Park | G06F 1/3231 |
| 11,113,024 | B2* | 9/2021 | Kim | H04L 51/10 |
| 11,294,554 | B2* | 4/2022 | Kim | G06F 1/3231 |
| 11,334,244 | B2* | 5/2022 | Choi | G06F 1/1616 |
| 11,449,119 | B2* | 9/2022 | Jung | G06F 1/3231 |
| 11,651,750 | B2* | 5/2023 | Kim | G09G 5/373 345/660 |
| 12,099,708 | B2* | 9/2024 | Chung | G06F 3/04886 |
| 2012/0047380 | A1 | 2/2012 | Nurmi | |
| 2019/0065240 | A1* | 2/2019 | Kong | G06F 3/04886 |
| 2021/0056878 | A1* | 2/2021 | Lee | G06F 3/041 |
| 2021/0109653 | A1* | 4/2021 | Choi | G06F 1/1641 |
| 2021/0191558 | A1* | 6/2021 | Jung | H04M 1/0235 |
| 2022/0147196 | A1* | 5/2022 | Kim | G06F 3/041 |
| 2023/0205555 | A1* | 6/2023 | Jung | H04M 1/72469 715/764 |
| 2023/0247129 | A1* | 8/2023 | Baek | G06F 3/0481 455/575.4 |
| 2024/0402866 | A1* | 12/2024 | Kim | G06F 3/0488 |

FOREIGN PATENT DOCUMENTS

| | | |
|---|---|---|
| KR | 10-2016-0026338 A | 3/2016 |
| KR | 10-2016-0054896 A | 5/2016 |
| KR | 10-2016-0055646 A | 5/2016 |
| KR | 10-2017-0019789 A | 2/2017 |
| KR | 10-2017-0090295 A | 8/2017 |
| KR | 10-2017-0100951 A | 9/2017 |
| KR | 10-2020-0112378 A | 10/2020 |
| KR | 10-2022-0053354 A | 4/2022 |

* cited by examiner

ELECTRONIC DEVICE PROVIDING USER INTERFACE

CROSS-REFERENCE TO RELATED APPLICATION(S)

This application is a continuation application, claiming priority under § 365(c), of an International application No. PCT/KR2021/014428, filed on Oct. 18, 2021, which is based on and claims the benefit of a Korean patent application number 10-2020-0139599, filed on Oct. 26, 2020, in the Korean Intellectual Property Office, the disclosure of which is incorporated by reference herein in its entirety.

BACKGROUND

1. Field

The disclosure relates to a technology for executing and outputting multiple applications in an electronic device.

2. Description of Related Art

In line with development of display technologies, various types of display devices have been developed. In order to meet the demands of users who want new and more diversified functions, efforts have recently been made to develop new types of display devices.

In order to overcome the restrictions imposed by the size of electronic devices that increases in proportion to that of displays, rollable displays and foldable display devices have been reviewed as next-generation flexible display devices. In the case of a rollable display, the flexible display may be moved into or out of the electronic device such that the display size can be changed as needed by the user. In the case of a foldable display, the flexible display may be folded or unfolded together with the electronic device including a hinge structure such that the display size can be changed. Meanwhile, the display of an electronic device may display multiple application execution screens. Some of the execution screens may be continuously displayed in an area of the display even when not used by the user for a designated time.

The above information is presented as background information only to assist with an understanding of the disclosure. No determination has been made, and no assertion is made, as to whether any of the above might be applicable as prior art with regard to the disclosure.

SUMMARY

Unnecessary power consumption may occur if an application execution screen is even displayed in an area of the display not used by the user for a designated time as described above.

In addition, if the flexible display is folded or moved into the electronic device, thereby reducing the display area exposed to the user, some application execution screens that have been executed may fail to be displayed on the display. This degrades the user's application usability.

Aspects of the disclosure are to address at least the above-mentioned problems and/or disadvantages and to provide at least the advantages described below. Accordingly, an aspect of the disclosure is to provide a technology for executing and outputting multiple applications in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a flexible display and at least one processor operably connected to the flexible display, wherein the at least one processor is configured to display a first execution screen of a first application in a first area of the flexible display, display a second execution screen of a second application in a second area sharing at least one periphery with the first area of the flexible display, acquire a pre-defined event associated with the second application, change the second execution screen of the second application displayed in the second area to a low-power mode, in response to the pre-defined event, while maintaining the first execution screen of the first application in the first area, and output partial contents selected from the second execution screen of the second application in consideration of at least one of a type or attribute of the second application while the second execution screen is in the low-power mode.

In accordance with another aspect of the disclosure, an electronic device is provided. The electronic device includes a flexible display and at least one processor operably connected to the flexible display, wherein the at least one processor is configured to control the flexible display so as to display multiple execution screens corresponding to multiple applications, respectively, in an active area having a first size, which is exposed to the outside of the electronic device, among the flexible display, compare, in response to reduction of the size of the active area of the flexible display from the first size to a second size, the number of the multiple execution screens currently displayed in the active area having the first size with the number of the multiple execution screens which can be displayed in the active area having the second size, reduce and display at least one execution screen of at least one application among the multiple applications according to the result of comparison, or may not display the at least one execution screen and display an object indicating the at least one application in the active area having the second size.

According to various embodiments disclosed herein, even after changing an application that has not been executed for a designated period of time to a low-power mode, an electronic device may display at least a part of the application execution screen or display an object indicating the application, thereby maintaining usability of the application.

In addition, according to various embodiments of the disclosure, even if the size of an active area of the display is changed, the electronic device may reduce some application execution screens or display objects indicating applications, thereby maintaining usability of the applications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
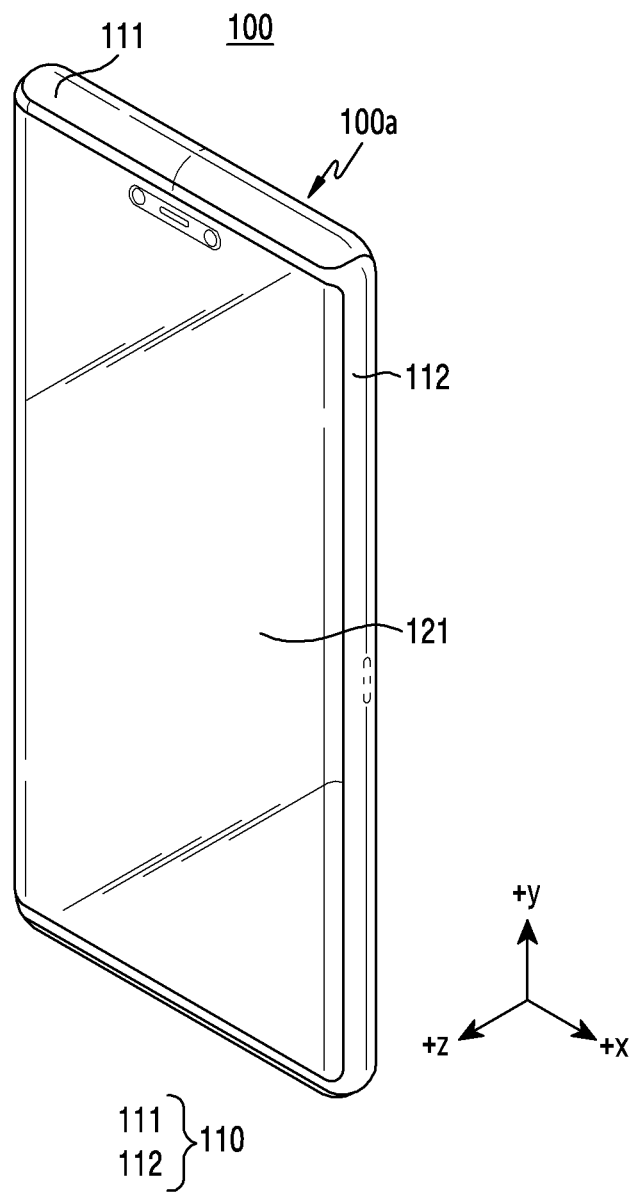
FIG. 1A is a front perspective view of an electronic device, which is in a first state according to an embodiment of the disclosure.

FIG. 1A is a front perspective view of an electronic device, which is in a first state according to an embodiment of the disclosure.

Figure 1B:
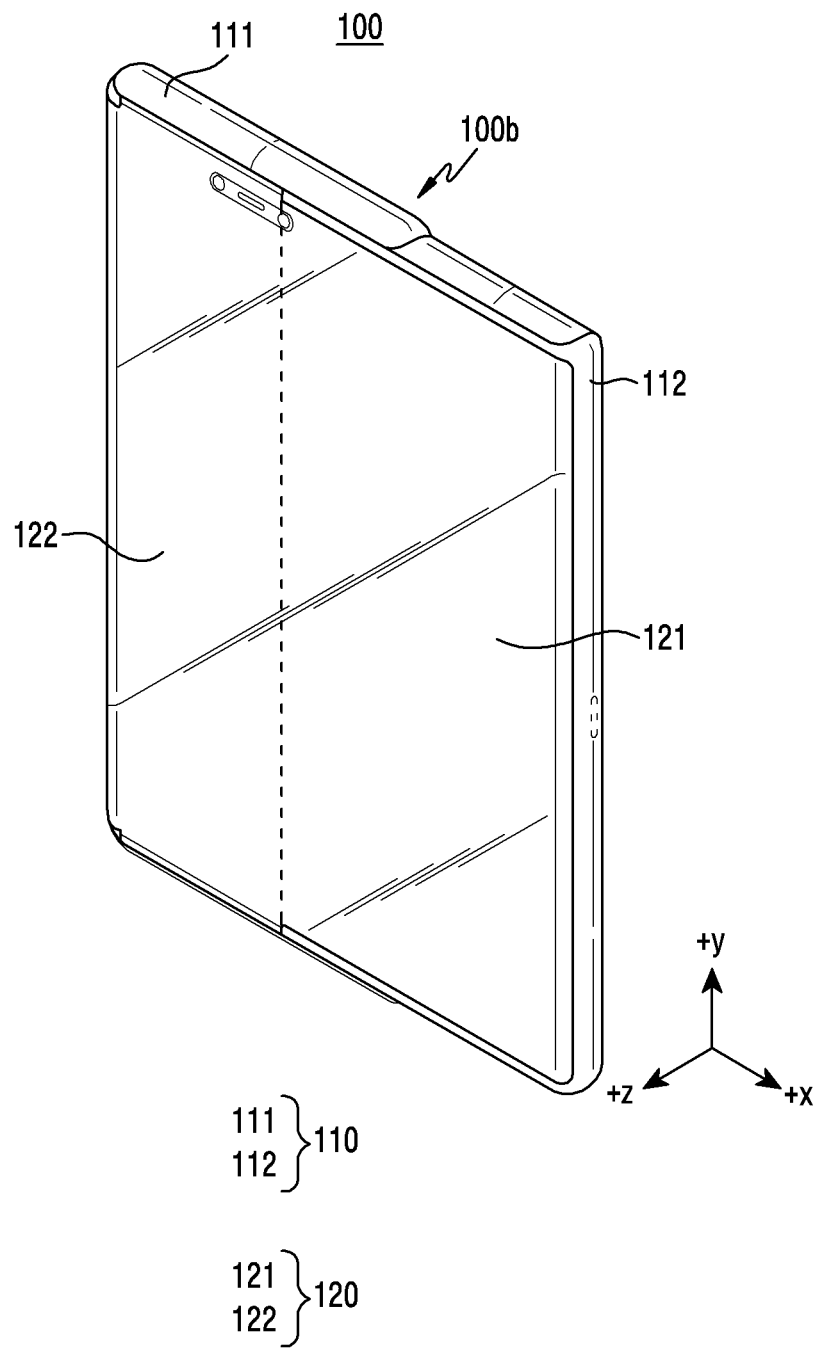
FIG. 1B is a front perspective view of an electronic device, which is in a second state according to an embodiment of the disclosure.

FIG. 1B is a front perspective view of an electronic device, which is in a second state according to an embodiment of the disclosure.

Referring to FIGS. 1A and 1B, an electronic device 100 according to an embodiment may include a housing 110 and a flexible display 120.

According to various embodiments disclosed herein, the surface on which the flexible display 120 is disposed may be defined as the front surface of the electronic device 100, and the surface opposite to the front surface may be defined as the rear surface of the electronic device 100. The surface surrounding the space between the front and rear surfaces may be defined as the side surface of the electronic device 100.

According to an embodiment of the disclosure, the housing 110 may form a partial area of the front surface of the electronic device 100, the rear surface, and the side surface thereof. According to another embodiment of the disclosure, the housing 110 may form a partial area of the side surface of the electronic device 100 and the rear surface thereof. In an embodiment of the disclosure, the housing 110 may include a conductive material (for example, metal).

According to an embodiment of the disclosure, the housing 110 may include a first housing 111 and a second housing 112 coupled to be able to move within a predetermined range with regard to the first housing 111.

The flexible display 120 according to an embodiment may occupy the majority of the front surface of the electronic device 100. For example, the front surface of the electronic device 100 may include a flexible display 120 and a bezel area partially surrounding the periphery of the flexible display 120.

The flexible display 120 according to an embodiment may be disposed to include at least a part having a planar shape and at least a part having a curved shape.

According to an embodiment of the disclosure, the flexible display 120 may include a first portion 121 which may be coupled to the second housing 112 and a second portion 122 which extends from the first portion 121 and can be moved into the electronic device 100.

According to an embodiment of the disclosure, the electronic device 100 may include a first state 100a and a second state 100b.

In an embodiment of the disclosure, the first state 100a and the second state 100b of the electronic device 100 may be determined according to the relative position of the second housing 112 with regard to the first housing 111. For example, referring to FIG. 1A, the state of the electronic device 100 in which the first housing 111 and the second housing 112 are adjacent to each other may be referred to as the first state 100a of the electronic device 100. As another example, referring to FIG. 1B, the state of the electronic device 100 in which the second housing 112 has slid in the +z direction in the first state 100a and thus moved away from the first housing 111 may be referred to as the second state 100b of the electronic device 100.

In an embodiment of the disclosure, the electronic device 100 may be changed between the first state 100a and the second state 100b by the user's manipulation or mechanical operation.

According to an embodiment of the disclosure, the second portion 122 of the flexible display 120 may be moved out of the electronic device 100 or moved therein according to the state of the electronic device 100. For example, as the electronic device 100 transitions from the first state 110a to the second state 100b, the second housing 112 may move in the +x direction, and the second portion 122 of the flexible display 120 may move out of the electronic device 100. As another example, as the electronic device 100 transitions from the second state 110b to the first state 100a, the second housing 112 may move in the −x direction, and the second portion 122 of the flexible display 120 may move into the electronic device 100.

In various embodiments of the disclosure, the description that the flexible display 120 is moved outwards (or exposed) may mean that the display part that has moved out is viewed from outside the electronic device 100, and the description that the flexible display 120 is moved inwards may mean that the part of the flexible display 120 that has moved inwards is not viewed from outside the electronic device 100.

According to an embodiment of the disclosure, the flexible display 120 may emit light from pixels in order to transfer information to the user, and light emitted the pixels may be transferred to the outside of the electronic device 100 through the flexible display 120. In an embodiment of the disclosure, the flexible display 120 may include a protective layer, such as tempered glass, and the flexible display 120 may, in this case, form at least a part of the front surface of the electronic device 100.

In various embodiments of the disclosure, the flexible display 120 may be referred to as a display. The type of the electronic device illustrated in FIGS. 1A and 1B is for the sake of describing an example of an electronic device having an expandable display area, and the type of the electronic device is not limited to that illustrated in FIGS. 1A and 1B.

Figure 2:
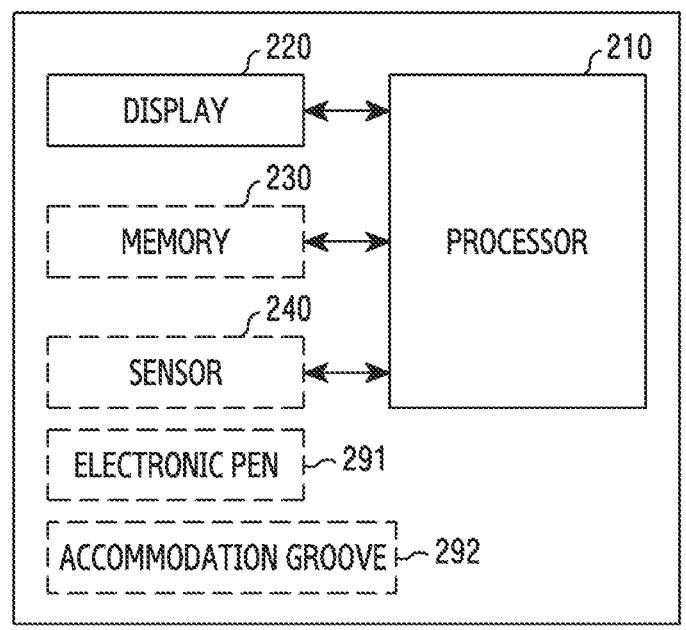
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, an electronic device 100 according to an embodiment may include a processor 210, a display 220, a memory 230, and a sensor 240. In an embodiment of the disclosure, the display 220 may include the flexible display 120 in FIGS. 1A and 1B. In various embodiments of the disclosure, the electronic device 100 may include additional components in addition to the components illustrated in FIG. 2, or at least one component illustrated in FIG. 2 may be omitted.

According to an embodiment of the disclosure, the processor 210 may control overall operations related to respective components of the electronic device 100. Particularly, the processor 210 may execute instructions loaded into the memory 230 so as to control operations of components (for example, the display 220) of the electronic device 100.

According to an embodiment of the disclosure, the processor 210 may execute instructions included in software so as to control at least one other component functionally connected to the processor 210. For example, if the user touches the "Save" button while a note application is executed, the processor 210 may perform the save function of the note application such that the content entered by the user on the execution screen of the note application is saved in the memory 230.

According to an embodiment of the disclosure, the processor 210 may acquire instructions, interpret the acquired instructions, and processor data or perform computations. Operations of the electronic device 100 mentioned herein may be understood as being performed by the processor 210 executing instructions.

According to an embodiment of the disclosure, the display 220 may visually display (provide or output) images. For example, the processor 210 of the electronic device 100 may display an application execution screen or a keypad screen through the display 220.

According to an embodiment of the disclosure, the display 220 may include an active area. In an embodiment of the disclosure, the active area of the display 220 may refer to an area of the display 220, which is exposed to the outside of the electronic device 100 and viewed by the user.

According to an embodiment of the disclosure, the size of the active area may be expanded or reduced according to the state of the electronic device 100. For example, when the electronic device 100 is in a first state (for example, the first state 100a in FIG. 1A), a first portion (for example, the first portion 121 in FIG. 1A) of the flexible display (for example, the flexible display 120 in FIG. 1A) may be solely exposed to the outside of the electronic device 100 and viewed by the user, and the first portion 121 of the flexible display 120 may accordingly be referred to as the active area of the flexible display 120. As another example, when the electronic device 100 is in a second state (for example, the second state 100b in FIG. 1B), the first portion 121 and a second portion (for example, the second portion 122 in FIG. 1B) of the flexible display 120 may be solely exposed to the outside of the electronic device 100 and viewed by the user, and the first portion 121 and the second portion 122 of the flexible display 120 may accordingly be referred to as the active area of the flexible display 120.

According to an embodiment of the disclosure, the memory 230 may play the role of storing programs and data necessary for operations of the electronic device 100. The memory 230 may include a program area and a data area according to the type of data stored therein. For example, the program area may store a program for controlling overall operations of the electronic device 100, an operating system (OS) for booting the electronic device 100, application programs for multimedia content playback and the like, application programs necessary for other optional functions (for example, a camera function, a sound playback function, an image or video playback function) of the electronic device 100, and the like. In addition, the data area, in which data generated as a result of using the electronic device 100 is stored, may store images, videos, phone books, audio data, and the like.

According to an embodiment of the disclosure, the electronic device 100 may include a sensor 240, and the sensor 240 may detect a contact made by an object on the display 220.

According to an embodiment of the disclosure, the processor 210 may receive a touch input to a screen displayed on the display 220 from the sensor 240. In an embodiment of the disclosure, the touch input may include, for example, coordinate values indicting the type of a touch event and the position in which a touch input is received. However, the type of the touch input is not limited.

According to an embodiment of the disclosure, the sensor 240 may include a sensor for detecting expansion and reduction of the size of the active area of the display 200. As used herein, the description that the expansion and reduction of the size of the active area of the display 220 are detected may mean that operations of expanding and reducing the size of the active area of the display 220 are detected.

According to an embodiment of the disclosure, the sensor 240 may detect a change in size of the active area of the display 220 when the electronic device 100 transitions from the first state 100*a* to the second state 100*b* or transitions from the second state 100*b* to the first state 100*a*. For example, if the user presses a button disposed on the side surface of the electronic device 100, the electronic device 100 transitions from the second state 100*b* to the first state 100*a*, the active area of the display 220 is reduced from a first size to a second size, and the sensor 240 may detect an operation of a part of the active area of the display 220 moving into the electronic device 100, thereby detecting reduction of the size of the active area of the display 220 to the second size.

As another example, if the user applies at least a predetermined level of pressure to the side surface of the electronic device 100, the electronic device 100 transitions from the first state 100*a* to the second state 100*b*, and the active area may be expanded from the second size to the first size. The sensor 240 may detect application of at least a predetermined level of pressure to the side surface of the electronic device 100, thereby detecting expansion of the size of the active area of the display 220 to the first size.

The processor 210 according to an embodiment may receive a signal regarding a change in size of the active area of the display 220 from the sensor 240, thereby identifying a change in size of the active area of the display 220.

The processor 210 according to an embodiment may determine the size of an execution screen of a currently executed application in response to a change in size of the active area of the display 220. For example, the processor 210 may maintain or expand the size of an application execution screen on which the last user input has been receive prior to reduction of the size of the active area of the display 220, and may reduce the size of other application execution screens.

The electronic device 100 according to an embodiment may include an electronic pen (291) and an accommodation groove (292), and the sensor 240 may include a sensor for detecting the electronic pen (291) being inserted into or separated from the accommodation groove (292). For example, when the electronic pen (291) is inserted into the accommodation groove (292) in the electronic device 100, the sensor 240 may contact the electronic pen (291) disposed and inserted into the accommodation groove (292), thereby detecting insertion of the electronic pen (291) into the accommodation groove (292) in the electronic device 100. As another example, the sensor 240 may receive a signal transmitted by the electronic pen (291) in response to insertion of the electronic pen (291) into the accommodation groove (292), thereby detecting insertion of the electronic pen (291) into the accommodation groove (292) in the electronic device 100.

Figure 3:
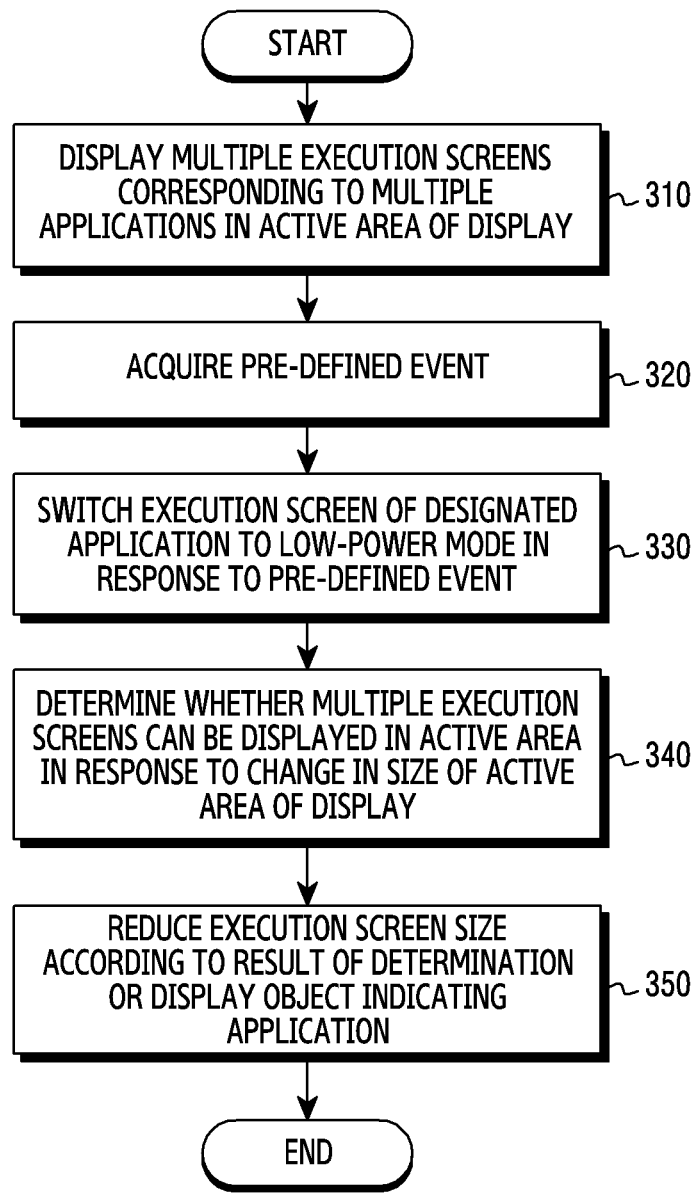
FIG. 3 is a flowchart illustrating a process in which an electronic device provides a user interface according to an embodiment of the disclosure.

FIG. 3 is a flowchart illustrating a process in which an electronic device provides a user interface according to an embodiment of the disclosure.

Referring to FIG. 3, a processor (for example, the processor 210 in FIG. 2) according to an embodiment may display multiple execution screens corresponding to multiple applications, respectively, on a flexible display (for example, the flexible display 120 in FIG. 1A) in operation 310. In an embodiment of the disclosure, the processor 210 may divide the active area of the flexible display 120 into multiple areas and may display execution screens on respective divided areas. For example, the processor 210 may divide the active area of the flexible display 120 of the electronic device 100 into two areas. The active area of the flexible display 120 divided into two areas may include a first area and a second area. The processor 210 may display an execution screen of a video playback application in the first area, and may display an execution screen of a note application in the second area.

According to an embodiment of the disclosure, the processor 210 may acquire a pre-defined event in operation 320. In an embodiment of the disclosure, the pre-defined event may include an event associated with a designated application and a normal event common to other applications. For example, with regard to an alarm application, the pre-defined event may include an event associated with the alarm application, such as elapse of a designed time (for example, one minute) since termination of the ongoing stopwatch function of the alarm application. As another example, the pre-defined event may include a normal event, such as absence of user input for a designated time (for example, one minute) on the alarm application execution screen.

According to an embodiment of the disclosure, the pre-defined event may be added or changed by a user input. For example, a pre-defined event related to a messenger application may include a case in which there is no input on the messenger application execution screen for 30 seconds. The user may change the period of 30 seconds to one minute of application through a user setting. As another example, the user may set the pre-defined event related to the messenger application so as to include a case in which there is no message received for a designed time (for example, one minute).

According to an embodiment of the disclosure, even when no pre-defined event has occurred, the user may manually switch the active area of the flexible display 120 on which a designated application execution screen is displayed (or the designated application execution screen) to a low-power mode.

According to an embodiment of the disclosure, the processor 210 may switch the active area of the flexible display 120 on which an application execution screen is currently displayed (or the application execution screen) to a low-power mode in response to a pre-defined event in operation 330. For example, if a pre-defined event occurs as a result of no message being received from the user for one minute in connection with the messenger application, the processor 210 may switch the active area of the flexible display 120 on which the messenger application execution screen is displayed (or the messenger application execution screen) to a low-power mode.

In an embodiment of the disclosure, the low-power mode may be implemented according to dimming and always-on-display (AOD) schemes. For example, if a pre-defined event occurs as a result of no message being received from the user for one minute in connection with the messenger application, the processor 210 may switch the active area of the flexible display 120 on which the messenger application execution screen is displayed (or the messenger application execution screen) to a low-power mode. In this regard, the processor 210 may adjust the brightness of the execution screen according to the dimming scheme, and may display received messages on the execution screen. As another example, if a pre-defined event occurs as a result of no touch input being made by the user for one minute in connection with a watch application, the active area of the flexible display 120 on which the analog watch application execution screen is displayed (or the analog watch application execution screen) may be switched to a low-power mode. In this regard, the brightness of the execution screen may be adjusted according to the AOD scheme, and changes of the hour hand, minute hand, and second hand of the analog watch application may be displayed on the execution screen. In an embodiment of the disclosure, the active area (or the analog watch application execution screen) switched to the low-power mode according to the AOD scheme may have a first screen scan rate (for example, 30 hertz (Hz)), and the active area in which the execution screen of an application that is not switched to the low-power mode is displayed (or the application execution screen) may have a second screen scan rate (for example, 60 Hz-120 Hz).

In an embodiment of the disclosure, the low-power mode may refer to a state wherein the lightness of the active area on which an application execution screen is displayed (or the application execution screen), the screen brightness, and the screen scan rate are decreased, a state wherein only an area of the application execution screen is displayed in the active area, or a state wherein an object (for example, an icon, a label, an application name) indicating an application is displayed. Hereinafter, the state of the active area (or the application execution screen) which is not switched to the low-power mode in response to the low-power mode of the application will be referred to as a "default mode".

According to an embodiment of the disclosure, the processor 210 may determine, in response to a change in size of the active area of the flexible display 120, whether multiple execution screens can be displayed in the active area in operation 340. For example, when the electronic device (for example, the electronic device 100 in FIG. 1A) is in the first state 100*a*, the active area of the flexible display 120 may have a second size, and when the electronic device 100 is in the second state 100*b*, the active area of the flexible display 120 may have a first size. As the electronic device 100 transitions from the first state 100*a* to the second state 100*b*, the processor 210 may compare the number of execution screens currently displayed in the active area of the flexible display 120 having the second size with the number of execution screens which can be accommodated by the active area of the flexible display 120 having the first size, thereby determining that the number of execution screens which can be accommodated by the active area of the flexible display 120 having the first size is larger. Based on the above determination, the processor 210 may determine that multiple execution screens currently displayed in the active area of the flexible display 120 having the second size can be displayed in the active area of the flexible display 120 having the first size.

According to another embodiment of the disclosure, the processor 210 may reconfigure and display execution screens in the active area having a changed size according to a determination other than "determining whether multiple execution screens can be displayed in the active area" in response to a change in size of the active area of the flexible display 120 in operation 340.

According to another embodiment of the disclosure, the processor 210 may determine, in response to a change in size of the active area of the flexible display 120, whether multiple execution screens can be displayed in the active area, and may then display execution screens corresponding to multiple applications in active area of the flexible display 120 according to various schemes in operation 340.

For example, when the electronic device 100 is in the first state 100*a*, the active area of the flexible display 120 may have a second size, and when the electronic device 100 is in the second state 100*b*, the active area of the flexible display 120 may have a first size. As the electronic device 100 transitions from the first state 100*a* to the second state 100*b*, the processor 210 may compare the number of execution screens currently displayed in the active area of the flexible display 120 having the second size with the number of execution screens which can be accommodated by the active area of the flexible display 120 having the first size, thereby determining that the number of execution screens which can be accommodated by the active area of the flexible display 120 having the first size is larger. Even when multiple execution screens currently displayed in the active area of the flexible display 120 having the second size can be displayed in the active area of the flexible display 120 having the first size, the processor 210 may not display some application execution screens according to the user setting, or may display reduced screen.

As another example, even when multiple execution screens currently displayed in the active area of the flexible display 120 having the second size can be displayed in the active area of the flexible display 120 having the first size, the processor 210 may not display execution screens in the active area switched to the low-power mode, may display reduced execution screens, or may display objects (for example, icons, labels) indicating applications. According to an embodiment of the disclosure, in operation 350, the processor may reduce execution screens of currently executed applications according to the result of determination, or may display objects (for example, icons, labels, application names) indicating applications instead of displaying execution screens. For example, the processor 210 may determine, in response to reduction in size of the active area of the flexible display 120, that multiple execution screens corresponding to currently executed multiple applications cannot be displayed in the reduced active area. According to the result of determination, the processor 210 may reduce the execution screen of the messenger application currently displayed in the active area switched to the low-power mode and may display the reduced execution screen in an area of the execution screen of the currently executed video playback application, or may display an object indicating the messenger application in an area of the execution screen of the video playback application.

Figure 4:
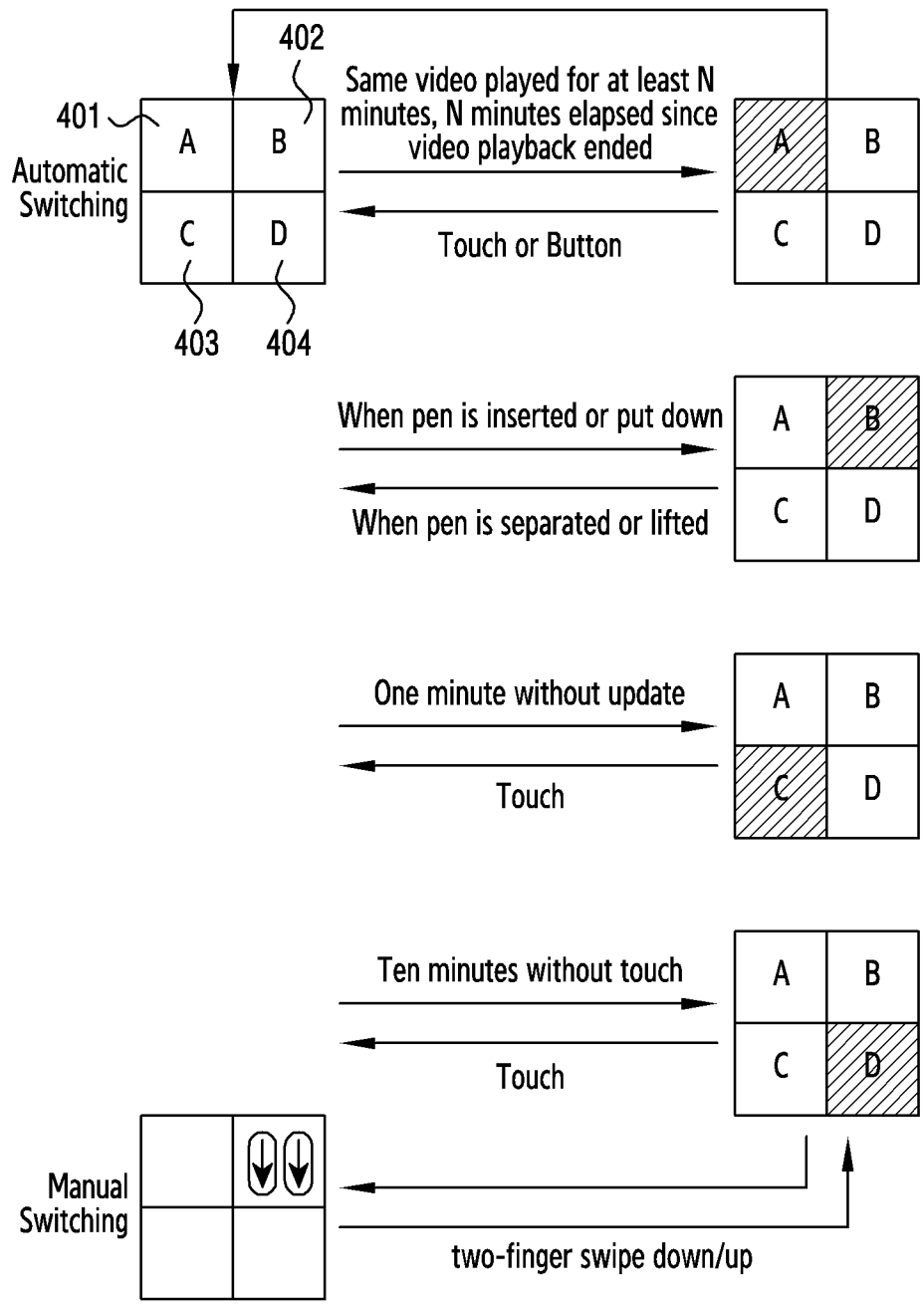
FIG. 4 illustrates a process in which a processor changes an application execution screen to a low-power mode according to an embodiment of the disclosure.

FIG. 4 illustrates a process in which a processor changes an application execution screen to a low-power mode according to an embodiment of the disclosure.

Referring to FIG. 4, the active area of a flexible display (for example, the flexible display 120 in FIG. 1A) according to an embodiment may include multiple areas. In an embodiment of the disclosure, the active area of the flexible display 120 may include a first area 401, a second area 402, a third area 403, and a fourth area 404.

According to an embodiment of the disclosure, execution screen A of a video playback application may be displayed in the first area 401. In an embodiment of the disclosure, a processor (for example, the processor 210 in FIG. 2) may acquire a pre-defined event with regard to the video playback application.

According to an embodiment of the disclosure, in response to the occurrence of the pre-defined event, the processor 210 may change the active area in which execution screen A is displayed (or execution screen A) to a low-power mode. For example, if there is no user input for a designated time (for example, one minute) since termination of playback of a video in execution screen A of the video playback application (that is, the pre-defined event has occurred), the processor 210 may change the active area in which execution screen A is displayed (or execution screen A) to a low-power mode. As another example, if a video has been played in execution screen A of the video playback application for a designated time (for example, ten minutes) with no user input, the processor 210 may change the active area in which execution screen A is displayed (or execution screen A) to a low-power mode.

According to an embodiment of the disclosure, the active area in the low-power mode (or execution screen A in the low-power mode) may be switched to a default mode by a user input. For example, if the user makes a touch input on execution screen A, the processor 210 may change the active area in the low-power mode (or execution screen A in the low-power mode) to the default mode. As another example, if the user presses a button disposed on the side surface of the electronic device (for example, the electronic device 100 in FIG. 1A), the processor 210 may change the active area in the low-power mode (or execution screen A in the low-power mode) to a default screen.

According to an embodiment of the disclosure, the active area (or the execution screen) changed from the low-power mode to the default mode may include two states. For example, if the user makes a touch input at a point on execution screen A with regard to the active area in the low-power mode in which execution screen A is displayed (or with regard to execution screen A in the low-power mode), the processor 210 may change the active area in the low-power mode in which execution screen A is displayed (or execution screen A in the low-power mode) to the default mode, and may simultaneously play again the video that has been played on execution screen A before switching to the low-power mode, thereby providing the video to the user. As another example, if the user makes a touch input at a first point on execution screen A with regard to the active area in the low-power mode in which execution screen A is displayed (or with regard to execution screen A in the low-power mode) and then releases the touch at a second point on execution screen A, which is spaced apart from the first point, the processor 210 may change the active area in the low-power mode in which execution screen A is displayed (or execution screen A in the low-power mode) to the default mode, and may provide the active area (or execution screen A) changed to the default mode such that the video that has been played until switching to the low-power model is paused.

According to an embodiment of the disclosure, execution screen B of a memo application may be displayed in the second area 402 of the active area of the flexible display 120. In an embodiment of the disclosure, the processor 210 may acquire a pre-defined event with regard to the memo application.

According to an embodiment of the disclosure, in response to the occurrence of the pre-defined event, the processor 210 may change the active area in which execution screen B is displayed (or execution screen B) to a low-power mode. For example, the electronic device 100 may have an electronic pen mounted therein so as to facilitate user inputs in connection with the memo application. An event occurs as a result of inserting the electronic pen into an accommodation groove disposed to mount the electronic pen in the electronic device 100 (that is, the pre-defined event has occurred), and the processor 210 may change, in response thereto, the active area in which execution screen B is displayed (or execution screen B) to a low-power mode.

As another example, an event occurs as a result of not using the electronic pen for facilitating user inputs for a designated time (for example, 30 seconds) (that is, the pre-defined event has occurred), and the processor 210 may change, in response thereto, the active area in which execution screen B is displayed (or execution screen B) to a low-power mode.

As another example, an event occurs as a result of having no user input (for example, touch input) on execution screen B of the memo application for a designated time (for example, one minute) (that is, the pre-defined event has occurred), and the processor 210 may change, in response thereto, the active area in which execution screen B is displayed (or execution screen B) to a low-power mode.

According to an embodiment of the disclosure, the active area in the low-power mode in which execution screen B of the memo application is displayed (or execution screen B in the low-power mode) may be switched to a default mode by a user input. For example, if the user makes a touch input on execution screen B, the active area in the low-power mode in which execution screen B of the memo application is displayed (or execution screen B in the low-power mode) may be switched to a default mode.

As another example, the electronic device 100 may have an electronic pen mounted therein so as to facilitate user inputs in connection with the memo application. If the separates the electronic pen mounted in the accommodation groove in the electronic device 100 from the electronic device 100, the processor 210 may identify separation of the electronic pen and thus change the active area in the low-power mode in which execution screen B of the memo application is displayed (or execution screen B in the low-power mode) to a default mode. In an embodiment of the disclosure, the processor 210 may receive a signal from a sensor (for example, the sensor 240 in FIG. 3) and thus identify separation of the electronic pen from the electronic device.

As another example, if the user uses the electronic pen separated from the electronic device 100, the processor 210 may identify use of the electronic pen and thus change the active area in the low-power mode in which execution screen B of the memo application is displayed (or execution screen B in the low-power mode) to a default mode. In an embodiment of the disclosure, the electronic pen may identify a pressure applied to the electronic pen by the user through a sensor 240 embedded in the electronic pen, and the electronic pen may transmit a signal to the processor 210 of the electronic device 100 such that the processor 210 may recognizes that the user is using the electronic pen.

According to an embodiment of the disclosure, execution screen C of a messenger application may be displayed in the third area 403 of the active area of the flexible display 120. In an embodiment of the disclosure, the processor 210 may acquire a pre-defined event with regard to the messenger application.

According to an embodiment of the disclosure, in response to the occurrence of the pre-defined event, the processor 210 may change the active area in which execution screen C is displayed (or execution screen C) to a low-power mode. For example, an event occurs are a result of having no user input for a designated time (for example, one minute) on execution screen C of the messenger application or having no message received (that is, the pre-defined event has occurred), and the processor 210 may change, in response thereto, the active area in which execution screen C is displayed (or execution screen C) to a low-power mode.

According to an embodiment of the disclosure, the active area in the low-power mode in which execution screen C of the messenger application is displayed (or execution screen C in the low-power mode) may be switched to a default mode by a user input. For example, if the user makes a touch input on execution screen C, the active area in the low-power mode in which execution screen C of the messenger application is displayed (or execution screen C in the low-power mode) may be changed to the default mode.

According to an embodiment of the disclosure, execution screen D of an Internet application may be displayed in the fourth area 404 of the active area of the flexible display 120. In an embodiment of the disclosure, the processor may acquire a pre-defined event with regard to the Internet application.

According to an embodiment of the disclosure, in response to the occurrence of the pre-defined event, the processor 210 may change the active area in which execution screen D is displayed (or execution screen D) to a low-power mode. For example, if there is no user input for a designated time (for example, ten minutes) on execution screen D of the Internet application (that is, the pre-defined event has occurred), the processor 210 may change, in response thereto, the active area in which execution screen D is displayed (or execution screen D) to a low-power mode.

According to an embodiment of the disclosure, the active area in the low-power mode in which execution screen D is displayed (or execution screen D in the low-power mode) may be switched to a default mode by a user input. For example, if the user makes a touch input on execution screen D, the active area in the low-power mode in which execution screen D of the internet application is displayed (or execution screen D in the low-power mode) may be changed to the default mode.

Figure 5:
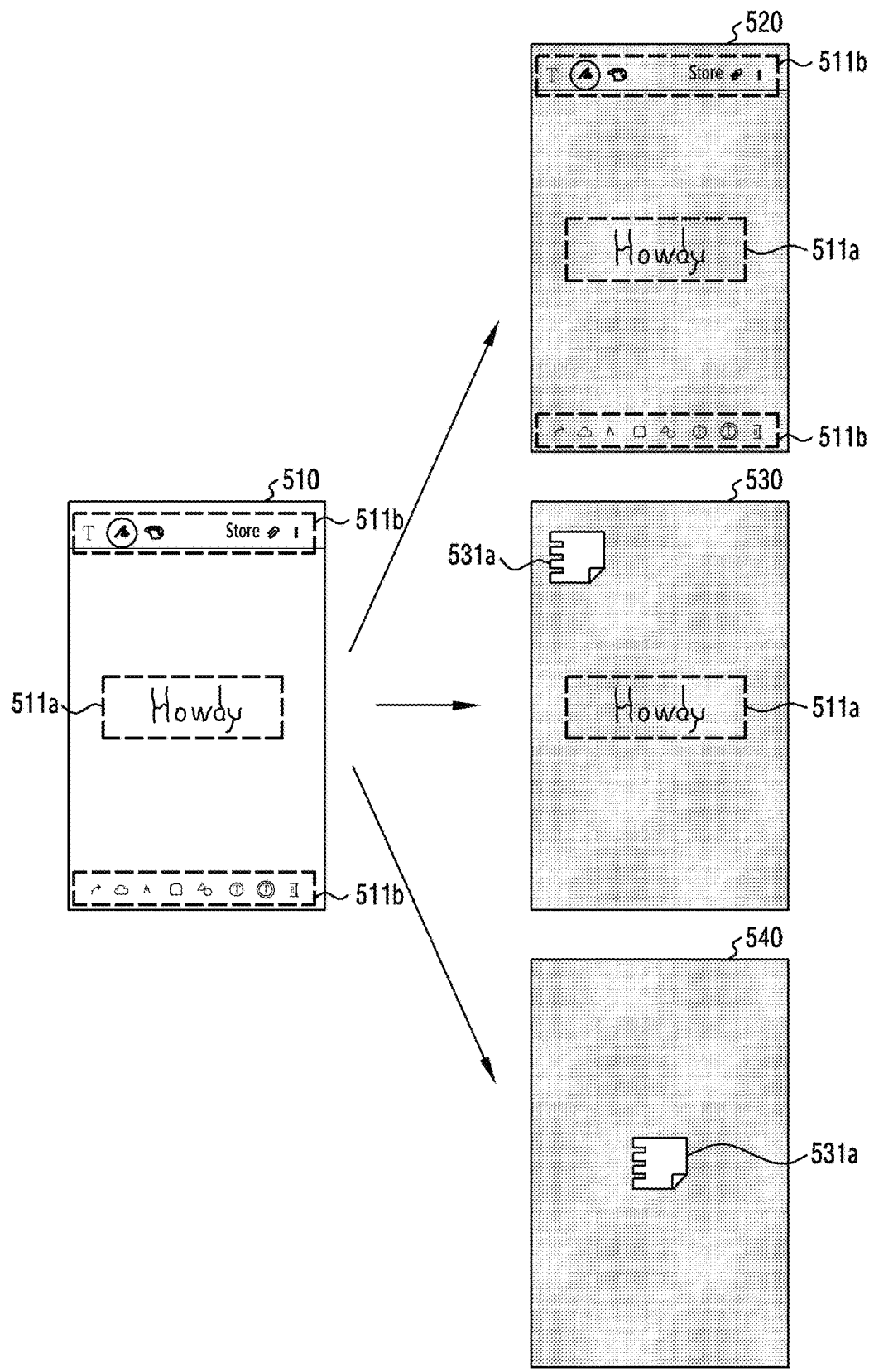
FIG. 5 illustrates a first low-power screen, a second low-power screen, and a third low-power screen according to an embodiment of the disclosure.

FIG. 5 illustrates a first low-power screen, a second low-power screen, and a third low-power screen according to an embodiment of the disclosure.

According to an embodiment of the disclosure, a processor (for example, the processor 210 in FIG. 2) may display an execution screen 510 of a default mode of a memo application in an area of the active area of a flexible display (for example, the flexible display 120 in FIG. 1A). Hereinafter, the execution screen 510 of the default mode will be referred to as a default screen 510. The default screen 510 of the memo application may include a memo area 511*a* in which user inputs are to be made, and a user interface (UI) area 511*b* for facilitating user inputs.

According to an embodiment of the disclosure, the processor 210 may change the default screen 510 to an execution screen 520 in a first low-power mode in response to a predetermined event.

In an embodiment of the disclosure, changing the default screen 510 to an execution screen 520 in a first low-power mode may correspond to switching the active area in which the default screen 510 is displayed (or the default-mode execution screen) to a low-power mode.

Hereinafter, the execution screen 520 in a first low-power mode may be referred to as a first low-power screen 520. In an embodiment of the disclosure, the first low-power screen 520 may refer to an execution screen in a low-power mode, in which all contents of the default-mode execution screen are shown.

According to an embodiment of the disclosure, the first low-power screen 520 may include a memo area 511*a* and a UI area 511*b*.

According to an embodiment of the disclosure, the processor 210 may adjust the lightness of the first low-power screen 520 and the brightness of the screen in response to a change from the default screen 510 to the first low-power screen 520. For example, the lightness of an execution screen displayed in an area of the active area of the flexible display 120 may be expressed by a lightness value B having a value between 0-100, and the processor 210 may make a change from the default screen 510 having a lightness value (B) of 100 to the first low-power screen 520 having a lightness value (B) of 25. As another example, the processor 210 may make a change from the default screen 510 having a lightness value (B) of 75 to the first low-power screen 520 having a lightness value (B) of 0.

As another example, the processor 210 may switch the active area in which an execution screen is displayed (or the execution screen) to a low-power mode, and may adjust the brightness of the active area (or execution screen) switched to the low-power mode to be lower than the brightness of the active area in which the default-mode execution screen is displayed (or the brightness of the default-mode execution screen).

According to an embodiment of the disclosure, in response to a change from the default screen 510 to the first low-power screen 520, the processor 210 may adjust the scan rate value of the first low-power screen 520 to be lower than the scan rate value of the default screen 510. For example, the processor 210 may switch the active area in which an execution screen is displayed (or the execution screen) to a first low-power mode, and may adjust the scan rate value of the active area (or the execution screen) switched to the low-power mode to have a scan rate value (for example, 30 Hz) lower than the scan rate value (for example, 60 Hz-120 Hz) of the default screen.

According to an embodiment of the disclosure, the processor 210 may adjust the lightness of the memo area 511*a* and the UI area 511*b* included in the first low-power screen, the screen brightness, and the screen scan rate. For example, the processor 210 may adjust the lightness value (B) of the first low-power screen 520 to have the value of 0, and may adjust the lightness value (B) of the memo area 511a and the UI area 511b to have the value of 25. In an embodiment of the disclosure, the user may distinguish the memo area 511a and the UI area 511b by means of the difference in lightness value between the first low-power screen 520 and the memo area 511a and the UI area 511b. According to an embodiment of the disclosure, the processor 210 may change the default screen 510 to an execution screen 530 in a second low-power mode in response to a pre-defined event.

In an embodiment of the disclosure, the description that the default screen 510 is changed to the execution screen 530 in the second low-power mode may be referred that the active area in which the default screen 510 is displayed (or the default-mode execution screen) is switched to a low-power mode.

Hereinafter, the execution screen 530 in the second low-power mode may be referred to as a second low-power screen 530. In an embodiment of the disclosure, the second low-power screen 530 may refer to an execution screen in a low-power mode, on which a part of the default-mode execution screen is shown.

According to an embodiment of the disclosure, the second low-power screen 530 may include a memo area 511a and an object (for example, an icon, a label, an application name) 531a indicating the memo application. In another embodiment of the disclosure, the memo area 511a may include a memo which has been highlighted by a user setting, or the last memo which has been input before the execution screen (or the active area in which the execution screen is displayed) is switched to a low-power mode. The memo area 511a is not limited the description "Howdy" in an embodiment.

According to an embodiment of the disclosure, the processor 210 may adjust the lightness of the second low-power screen 530, the screen brightness, and the screen scan rate value in response to a change from the default screen 510 to the second low-power screen 530. In an embodiment of the disclosure, the lightness of the second low-power screen 530, the screen brightness, and the screen scan rate value may be adjusted in the same manner as the above-described manner in which the lightness of the first low-power screen 520, the screen brightness, and the screen scan rate value are adjusted.

According to an embodiment of the disclosure, the processor 210 may adjust the lightness of the memo area 511a included in the second low-power screen, the screen brightness, and the screen scan rate.

According to another embodiment of the disclosure, the object indicating the memo application may not be included on the second low-power screen 530. For example, in response to a change from the default screen 510 to the second low-power screen 530, the processor 210 may display only the memo area 511a on the second low-power screen 530 and may not display the object 531a indicting the memo application, according to a user setting.

According to an embodiment of the disclosure, the processor 210 may change the default screen 510 to an execution screen 540 in a third low-power mode in response to a pre-defined event.

In an embodiment of the disclosure, the description that the default screen 510 is changed to the execution screen of 540 in the third low-power mode may mean that the active area in which the default screen 510 is displayed (or the default-mode execution screen) is switched to a low-power mode.

Hereinafter, the execution screen 540 in the third low-power mode may be referred to as a third low-power screen 540. In an embodiment of the disclosure, the third low-power screen 540 may refer to an execution screen in a low-power mode, on which an object (for example, an icon, a label) indicating a designated application is shown.

According to an embodiment of the disclosure, the third low-power screen 540 may include an object 531a (for example, an icon, a label) indicating a memo application.

According to an embodiment of the disclosure, the processor 210 may adjust the lightness of the third low-power screen 540, the screen brightness, and the screen scan rate value in response to a change from the default screen 510 to the third low-power screen 540. In an embodiment of the disclosure, the lightness of the third low-power screen 540, the screen brightness, and the screen scan rate value may be adjusted in the same manner as the above-described manner in which the lightness of the first low-power screen 520, the screen brightness, and the screen scan rate value are adjusted.

According to an embodiment of the disclosure, the object 531a indicating the memo application displayed on the third low-power screen 540 may be displayed in an area of the third low-power screen 540. For example, the object indicating the memo application may be disposed on a periphery of the third low-power screen 540. As another example, the object indicating the memo application may be disposed on a corner of the third low-power screen 540.

According to an embodiment of the disclosure, the processor 210 may change the default-mode execution screen of an application (for example, a video playback application, a messenger application) other than the memo application to a first low-power screen, a second low-power screen, or a third low-power screen. For example, the processor 210 may change the execution screen of the video playback application to a first low-power screen, may adjust the lightness of the first low-power screen, the screen brightness, and the screen scan rate value, and may display a video display area and a video application UI area on the first low-power screen.

As another example, the processor 210 may change the execution screen of the video playback application to a second low-power screen and may simultaneously display a video display area and an object (for example, an icon, a label) indicating the video playback application on the low-power screen.

As another example, the processor 210 may change the execution screen of the video playback application to a third low-power screen and may display an object indicating the video playback application on the third low-power screen.

Figure 6A:
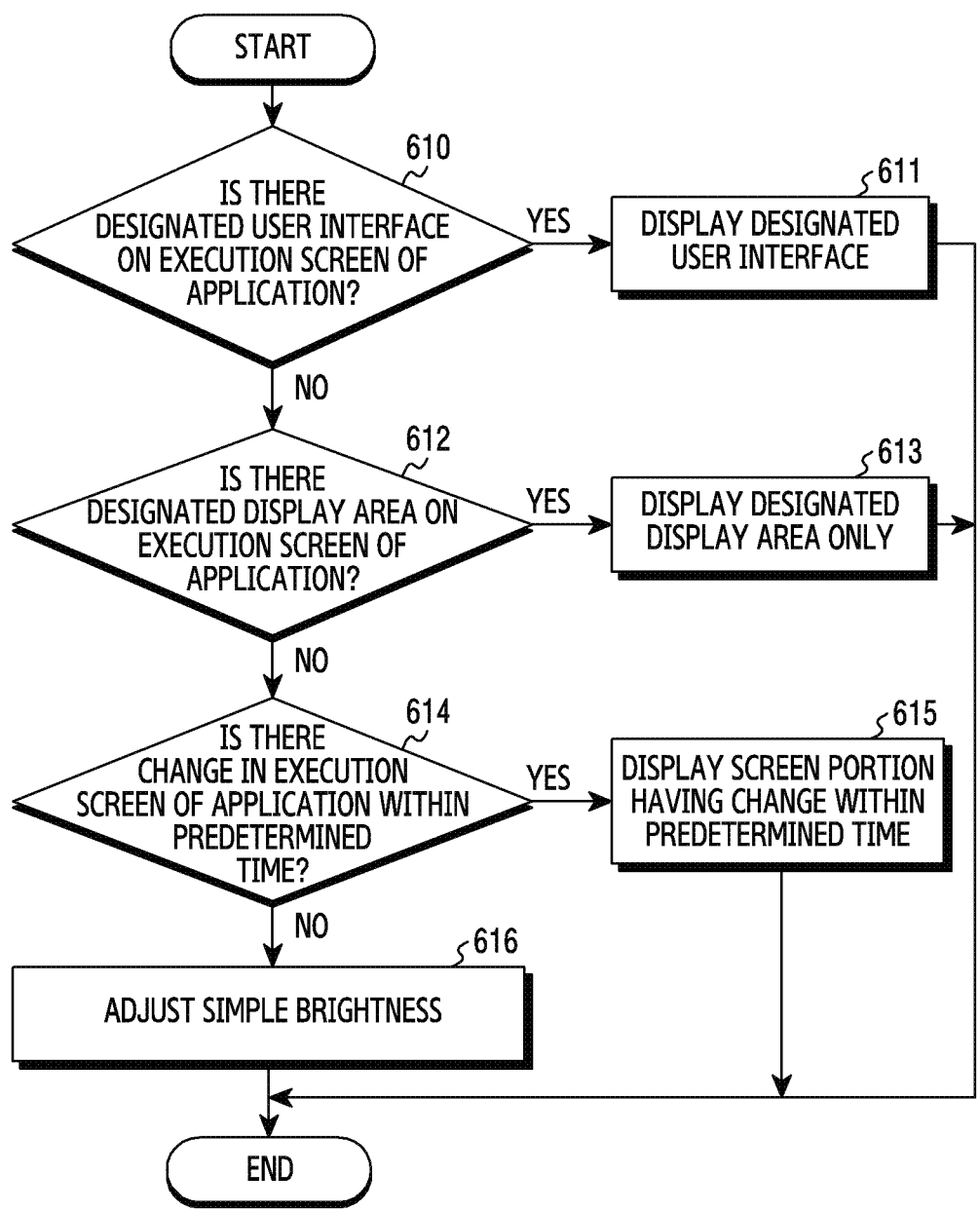
FIG. 6A is a flowchart of a method for selecting an object displayed on a second low-power screen display according to an embodiment of the disclosure.

FIG. 6A is a flowchart of a method for selecting an object displayed on a second low-power screen display according to an embodiment of the disclosure.

Figure 6B:
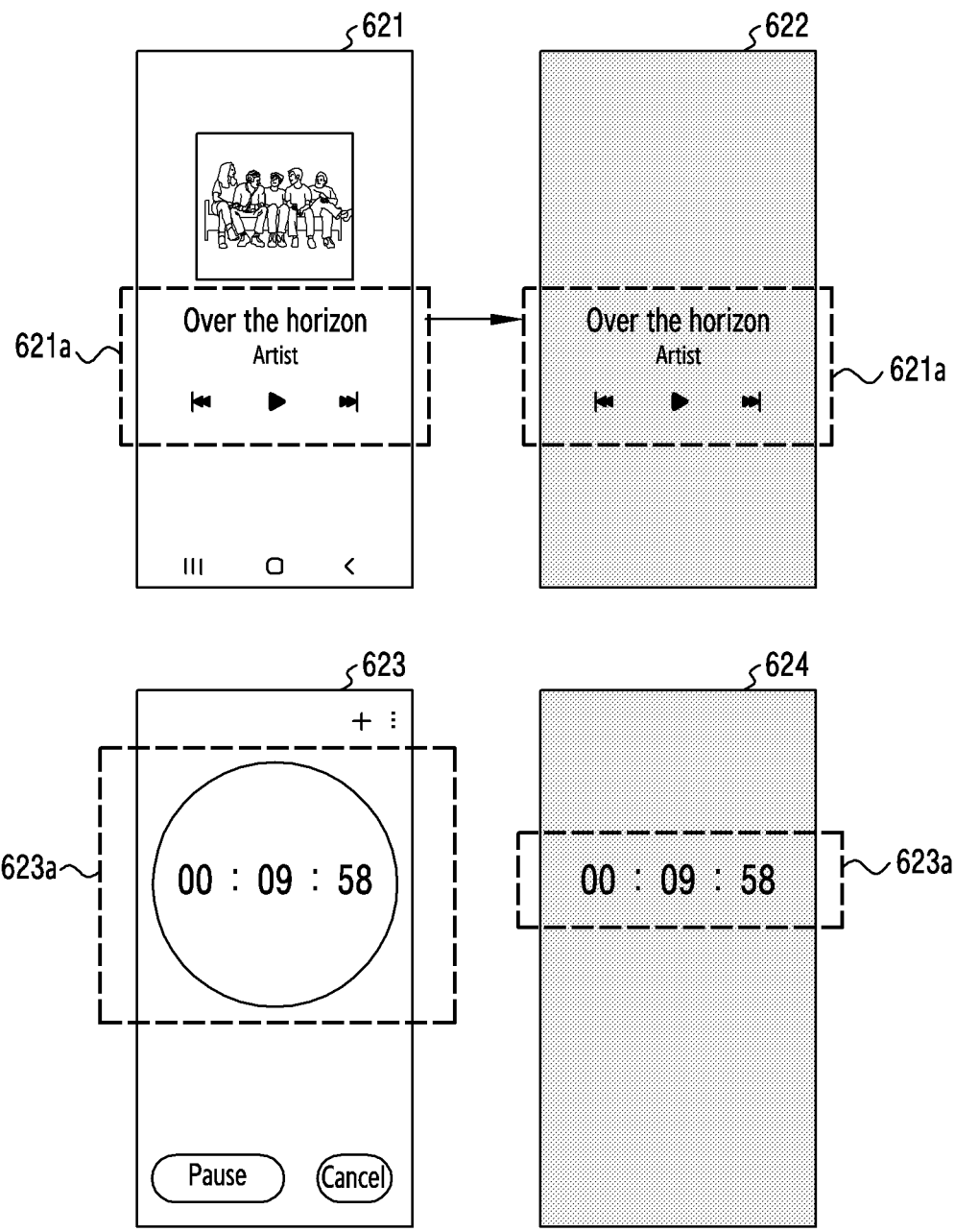
FIG. 6B illustrates an embodiment of displaying a user interface designated by an application on a second low-power screen according to an embodiment of the disclosure.

FIG. 6B illustrates an embodiment of displaying a user interface designated by an application on a second low-power screen according to an embodiment of the disclosure.

Figure 6C:
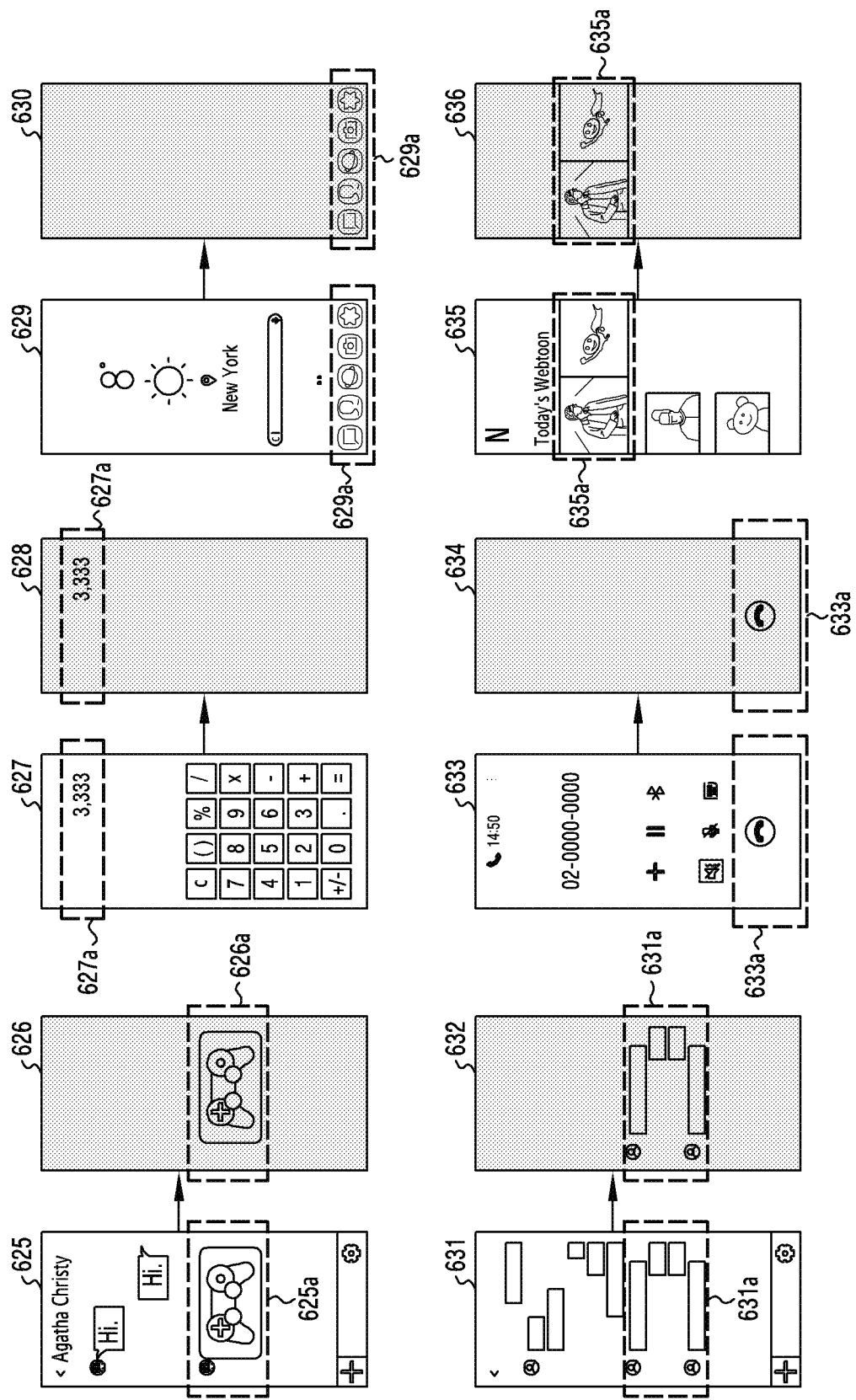
FIG. 6C illustrates an embodiment of displaying a display area designated by an application on a second low-power screen according to an embodiment of the disclosure.

FIG. 6C illustrates an embodiment of displaying a display area designated by an application on a second low-power screen according to an embodiment of the disclosure.

Figure 6D:
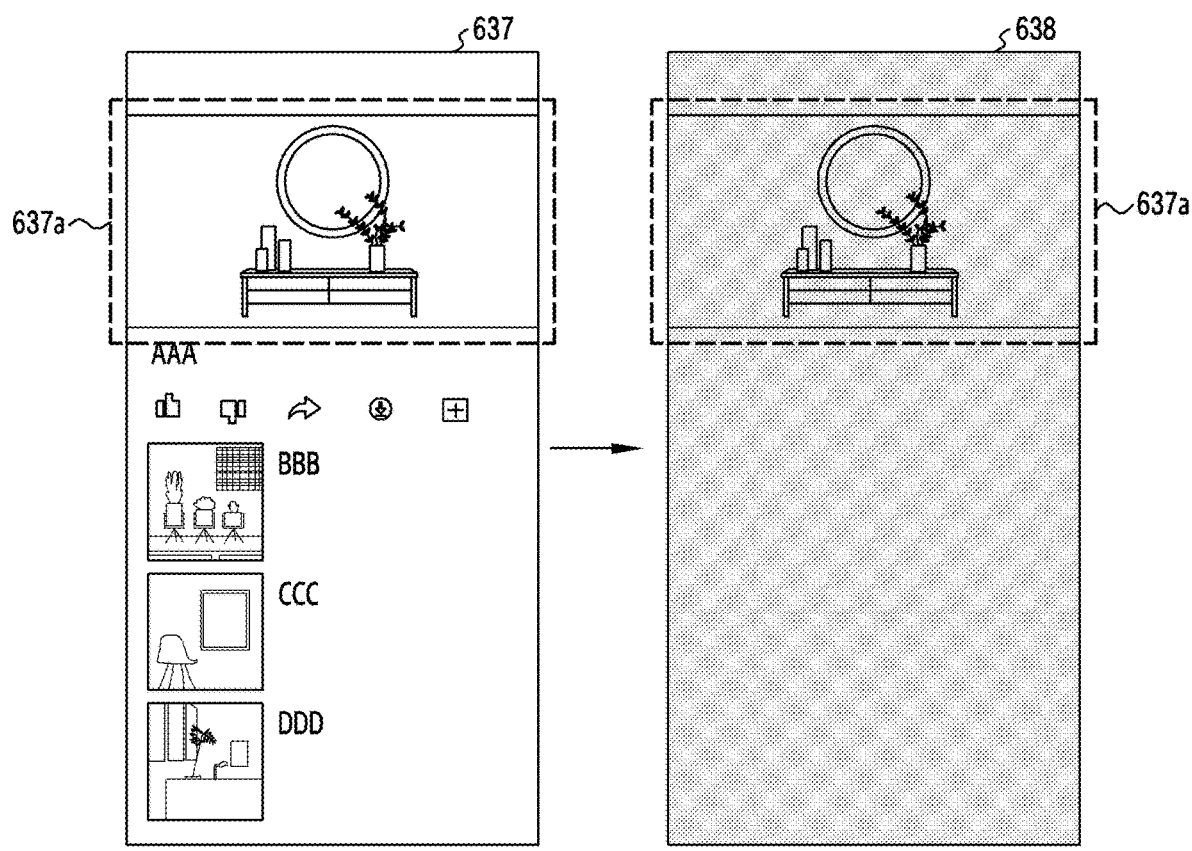
FIG. 6D illustrates an embodiment of displaying an area of a default screen on a second low-power screen according to an embodiment of the disclosure.

FIG. 6D illustrates an embodiment of displaying an area of a default screen on a second low-power screen according to an embodiment of the disclosure.

Referring to FIG. 6A, a processor (for example, the processor 210 in FIG. 2) according to an embodiment may change the default screen of an application to a second low-power screen and may determine an object to be displayed on the second low-power screen.

According to an embodiment of the disclosure, the processor 210 may determine whether there is a user interface separately designated by the application in operation 610. In an embodiment of the disclosure, if there is a user interface designated by the application, the processor 210 may display the designated interface on the second low-power screen in operation 611.

Referring to FIG. 6B, the default screen 621 of the music application may include a user interface portion 621a separately designated by the music application. The processor 210 may determine that the user interface portion 621a exists on the music application execution screen, may change, based on the determination, the default screen 621 of the music application to a second low-power screen 622 of the music application, and may display the designated user interface portion 621a on the second low-power screen 622 of the music application. In an embodiment of the disclosure, the processor 210 may change the default screen 621 of the music application to a second low-power screen 622 of the music application and may adjust the lightness of the second low-power screen 622 of the music application, the screen brightness, and the screen scan rate value.

Referring to FIG. 6B, the default screen 623 of the alarm application may include a user interface portion 623a separately designated by the alarm application. In an embodiment of the disclosure, the processor 210 may determine that the designated user interface portion 623a exists on the alarm application execution screen, may change, based on the determination, the default screen 623 of the alarm application to a second low-power screen 624 of the alarm application, and may display the designated user interface portion 623a on the second low-power screen 624 of the alarm application. In an embodiment of the disclosure, the processor 210 may adjust the lightness of the second low-power screen 624 of the alarm application, the screen brightness, and the screen scan rate value. In an embodiment of the disclosure, even if the alarm application has no separately designated user interface portion 623a, the portion may correspond to an area in which the application execution screen has a change within a predetermined time. The processor 210 may determine, in operation 614, that the portion corresponds to a portion on which the application execution screen has a change within a predetermined time, and may display the portion on an active area (or an execution screen) switched to a low-power mode.

Referring to FIG. 6A, if there is no designated user interface on the application execution screen according to an embodiment of the disclosure, the processor 210 may determine whether there is a display area separately designated by the application in operation 612. In operation 613 according to an embodiment of the disclosure, the processor 210 may display the designated display area on the second low-power screen if there is a display area designated by the application.

Referring to FIG. 6C, a default screen 625 of the first messenger application may include a display area 625a separately designated by the first messenger application. The processor 210 may determine that there is no designated user interface on the execution screen of the first messenger application, and may determine that a designated display area 625a exists on the execution screen. Based on the determination, the processor 210 may change the default screen 625 of the first messenger application to a second low-power screen 626 of the first messenger application, and may display the designated display area 625a on the second low-power screen 626 of the first messenger application as a display area 626b. In an embodiment of the disclosure, the processor 210 may change the default screen 625 of the first messenger application to the second low-power screen 626 of the first messenger application and may adjust the lightness of the second low-power screen 626 of the first messenger application, the screen brightness, and the screen scan rate value. In an embodiment of the disclosure, even if there is no user interface portion 623a separately designated by the first messenger application, the portion may correspond to an area in which the application execution screen has a change within a predetermined time. The processor 210 may determine, in operation 614, that the portion corresponds to a portion on which the application execution screen has a change within a predetermined time, and may display the portion on an active area (or an execution screen) switched to a low-power mode.

Referring to FIG. 6C, a default screen 627 of the calculator application may include a display area 627a separately designated by the calculator application. The processor 210 may determine that there is no designated user interface on the execution screen of the calculator application, and may determine that a designated display area 627a exists on the execution screen. Based on the determination, the processor 210 may change the default screen 627 of the calculator application to a second low-power screen 628 of the calculator application, and may display the designated display area 627a on the second low-power screen 628 of the calculator application. In an embodiment of the disclosure, the processor 210 may change the default screen 627 of the calculator application to the second low-power screen 628 of the calculator application and may adjust the lightness of the second low-power screen 628 of the calculator application, the screen brightness, and the screen scan rate value.

According to an embodiment of the disclosure, different applications, even though performing the same function, may have different designated display areas. For example, referring to FIG. 6C, the display area 625a of the execution screen of the first messenger application may include the last updated message on the default screen 625 of the first messenger application. As another example, a display area 631a of the execution screen of the second messenger application may include a message updated for a designated time on a default screen 631 of the second messenger application. In an embodiment of the disclosure, the display area 631a of the default screen 631 of the second messenger application may include multiple messages updated for a designated time (for example, 30 seconds). The processor 210 may change the default screen 631 of the first messenger application to a second low-power screen 632 of the first messenger application, and may display the designated display area 631a on the second low-power screen 632 of the first messenger application.

Referring to FIG. 6C, a default screen 633 of the telephone application may include a display area 633a separately designated by the telephone application. The processor 210 may determine that there is no designated user interface on the execution screen of the telephone application, and may determine that a designated display area 633a exists on the execution screen. Based on the determination, the processor 210 may change the default screen 633 of the telephone application to a second low-power screen 634 of the telephone application, and may display the designated display area 633a on the second low-power screen 634 of the telephone application. In an embodiment of the disclosure, the processor 210 may change the default screen 633 of the telephone application to the second low-power screen 634 of the telephone application and may adjust the lightness of the second low-power screen 634 of the telephone application, the screen brightness, and the screen scan rate value.

Referring to FIG. 6C, a default screen 635 of the Internet application may include a display area 635a separately designated by the Internet application. The processor 210 may determine that there is no designated user interface on the execution screen of the Internet application, and may determine that a designated display area 635a exists on the execution screen. Based on the determination, the processor 210 may change the default screen 635 of the Internet application to a second low-power screen 636 of the Internet application, and may display the designated display area 635a on the second low-power screen 636 of the Internet application. In an embodiment of the disclosure, the processor 210 may change the default screen 635 of the Internet application to the second low-power screen 636 of the Internet application and may adjust the lightness of the second low-power screen 636 of the Internet application, the screen brightness, and the screen scan rate value.

According to an embodiment of the disclosure, when the processor 210 changes the active area in which the execution screen of an application is displayed (or the execution screen) to a low-power mode, information regarding the designated application may be omitted according to a user setting. For example, referring to FIG. 6C, the processor 210 may switch a default screen 629 of the weather application to a second low-power screen 630, and may display no separate object associated with the weather application on the second low-power screen. In this case, the processor 210 may display an application taskbar 629a on the second low-power screen 630 in order to maintain the usability of applications other than the weather application.

Referring to FIG. 6A, if there is no separately designated display area on the application execution screen, the processor 210 according to an embodiment may determine whether an area having a change for a designated time on the default screen of the application exists in operation 614. In operation 615 according to an embodiment of the disclosure, if an area having a change for a designated time on the default screen of the application exists, the processor 210 may display the same on the second low-power screen.

Referring to FIG. 6D, a default screen 637 of the video playback application may include an area 637a having a change for a designated time (for example, video playback time) on the default screen 637 of the video playback application. The processor 210 may determine that there is no designated user interface on the execution screen of the video playback application, may determine that there is no designated display area on the execution screen, and may determine that there is an area 637a having a change for a designated time on the execution screen. Based on the determination, the processor 210 may change the default screen 637 of the video playback to a second low-power screen 638 of the video playback application, and may display the area 637a having a change on the second low-power screen 638. In an embodiment of the disclosure, the processor 210 may change the default screen 637 of the video playback application to the second low-power screen 638 of the video playback application and may adjust the lightness of the second low-power screen 638 of the video playback application, the screen brightness, and the screen scan rate value. Referring to FIG. 6A, if the default screen of the application includes no area having a change for a designated time according to an embodiment of the disclosure, the processor 210 may change the default screen of the application to a second low-power screen and may adjust the simple brightness or lightness of the second low-power screen, the screen brightness, and the screen scan rate value in operation 616.

Figure 7A:
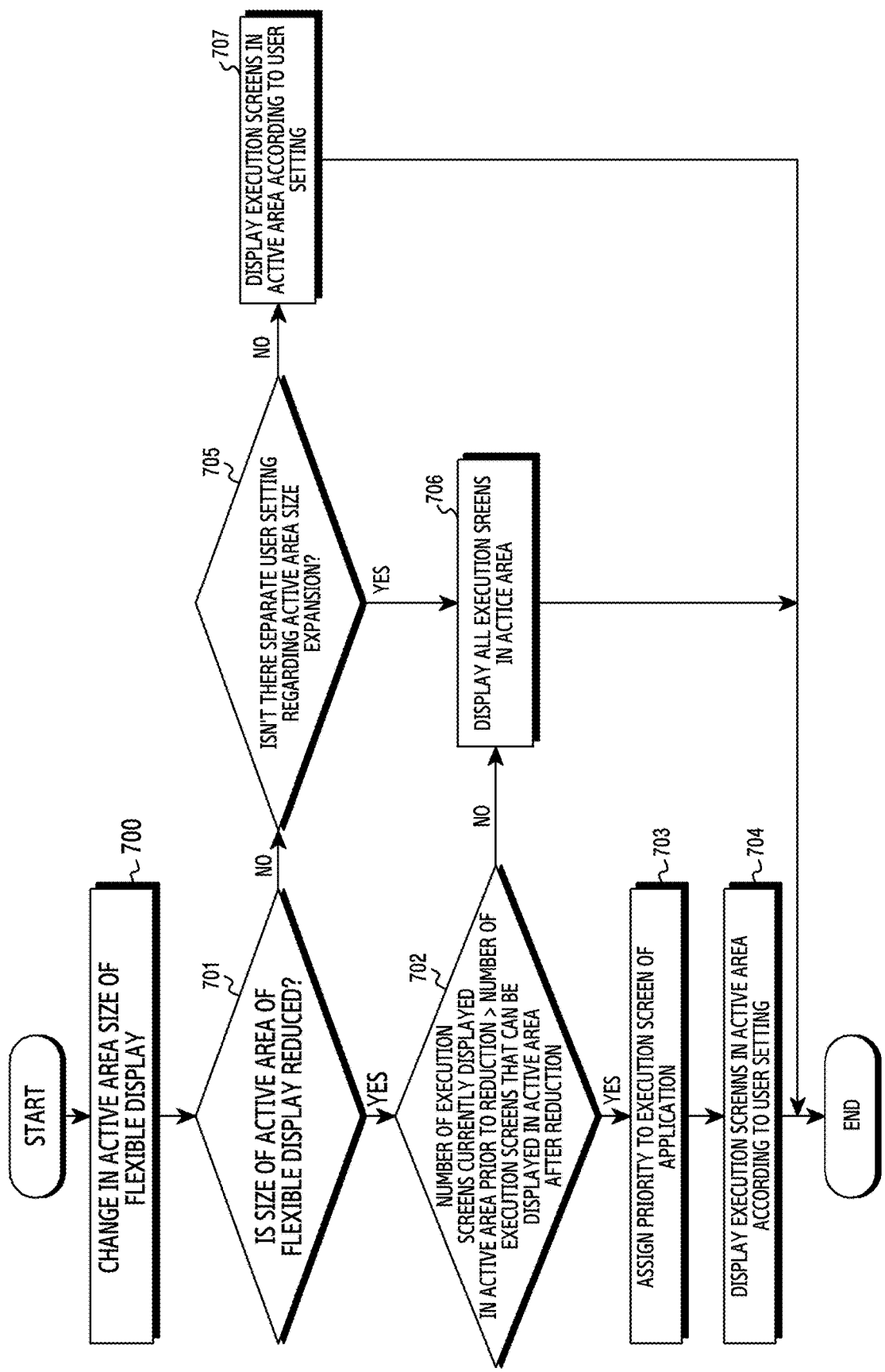
FIG. 7A is a flowchart of a method in which a processor reconfigures multiple execution screens corresponding to multiple applications in response to a change in size of an active area of a flexible display according to an embodiment of the disclosure.

FIG. 7A is a flowchart of a method in which a processor reconfigures multiple execution screens corresponding to multiple applications in response to a change in size of an active area of a flexible display according to an embodiment of the disclosure.

Figure 7B:
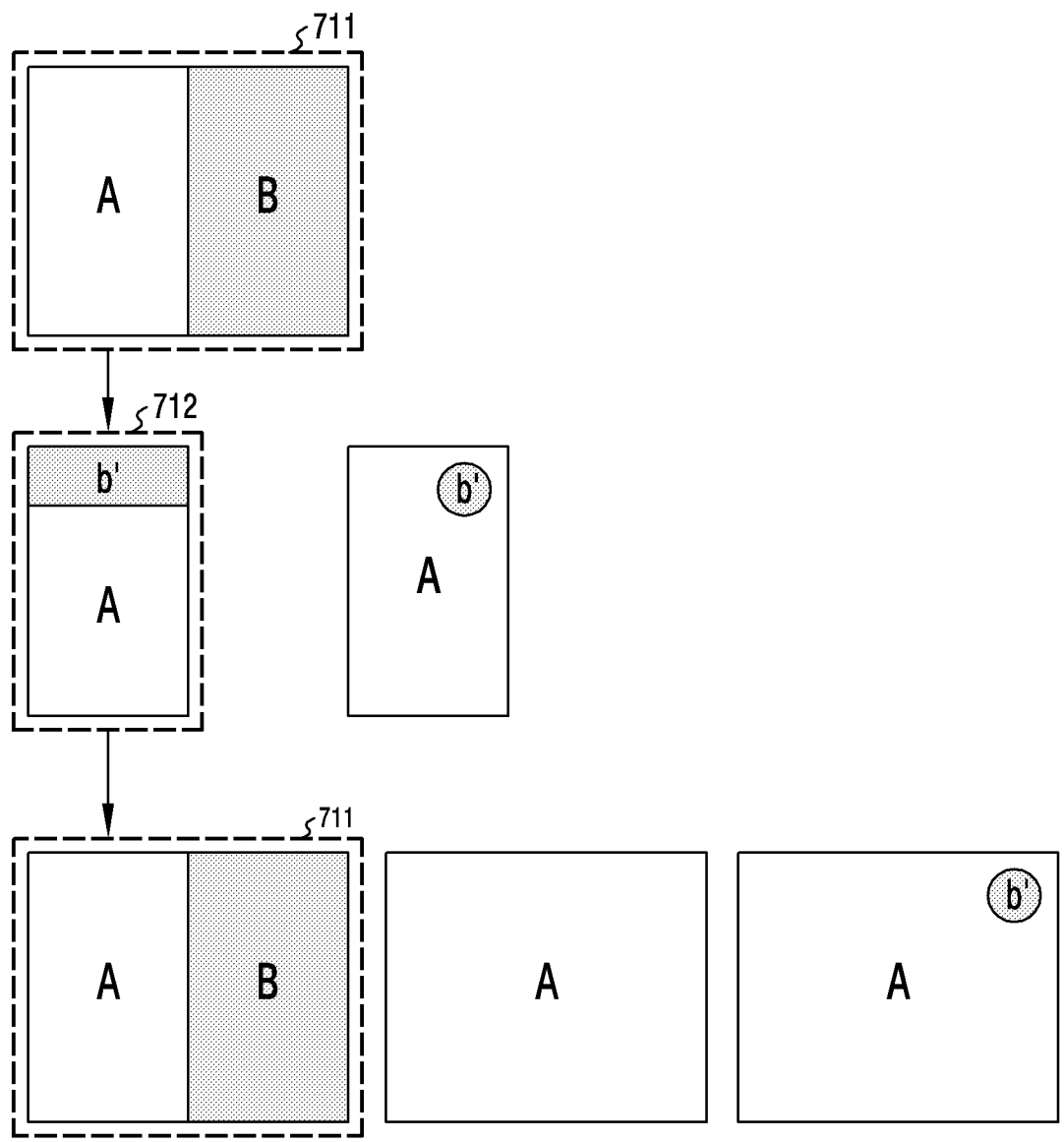
FIG. 7B illustrates a process in which a processor reconfigures multiple execution screens corresponding to multiple applications in response to a change in size of an active area divided into two parts according to an embodiment of the disclosure.

FIG. 7B illustrates a process in which a processor reconfigures multiple execution screens corresponding to multiple applications in response to a change in size of an active area divided into two parts according to an embodiment of the disclosure.

Figure 7C:
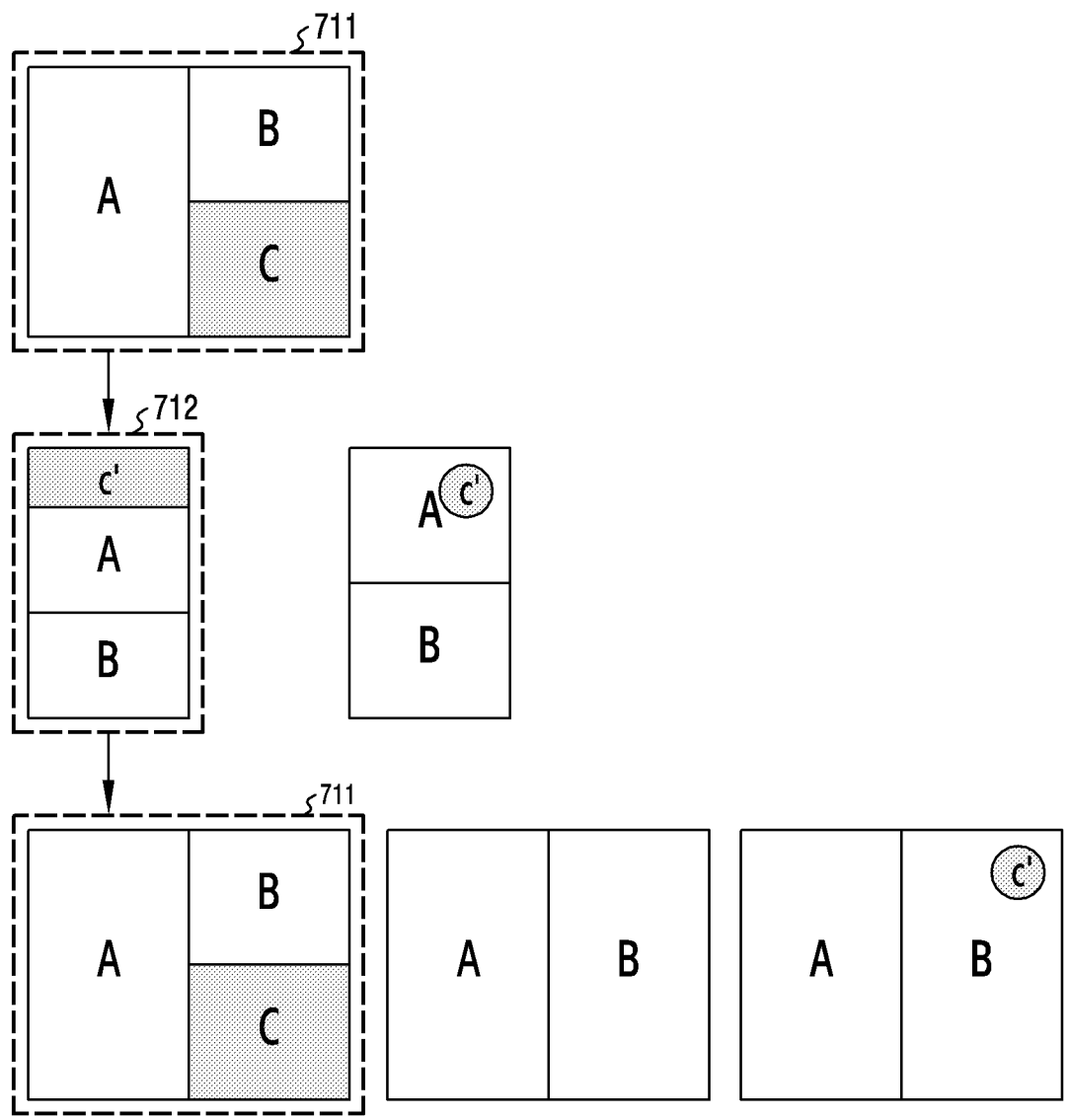
FIG. 7C illustrates a process in which a processor reconfigures execution screens in an active area including two low-power screens in response to a change in size of an active area divided into three parts according to an embodiment of the disclosure.

FIG. 7C illustrates a process in which a processor reconfigures execution screens in an active area including two low-power screens in response to a change in size of an active area divided into three parts according to an embodiment of the disclosure.

Figure 7D:
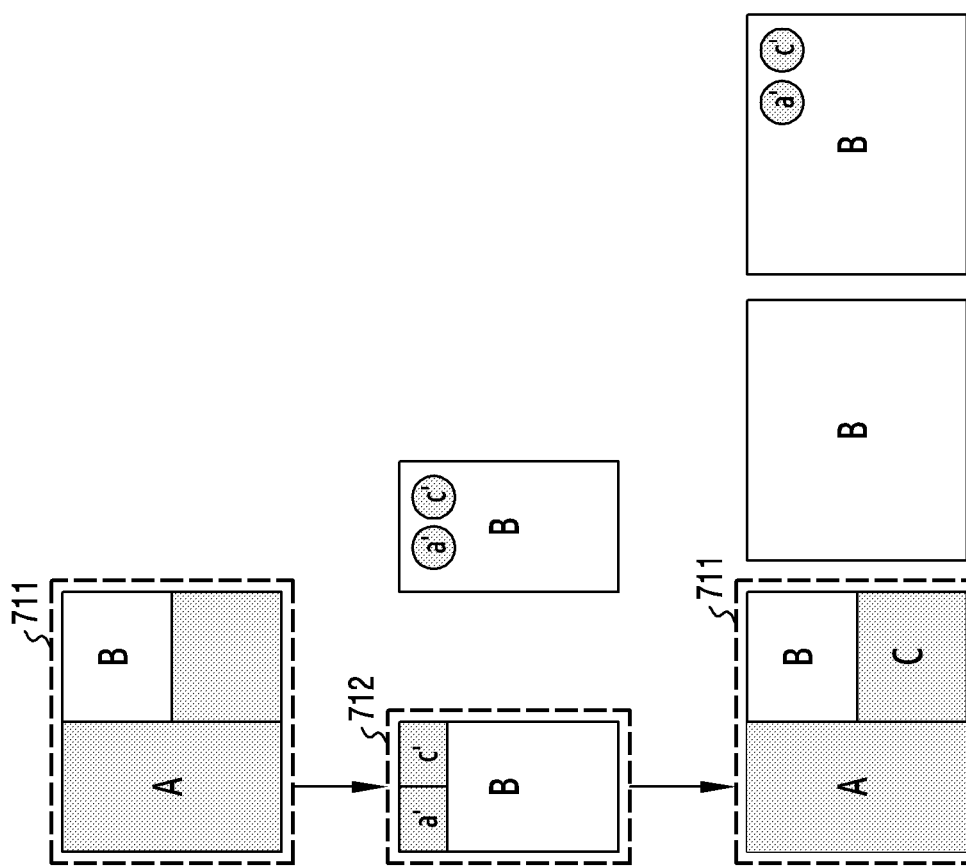
FIG. 7D illustrates a process in which a processor reconfigures execution screens in an active area including one low-power screen in response to a change in size of an active area divided into three parts according to an embodiment of the disclosure.

FIG. 7D illustrates a process in which a processor reconfigures execution screens in an active area including one low-power screen in response to a change in size of an active area divided into three parts according to an embodiment of the disclosure.

Figure 7E:
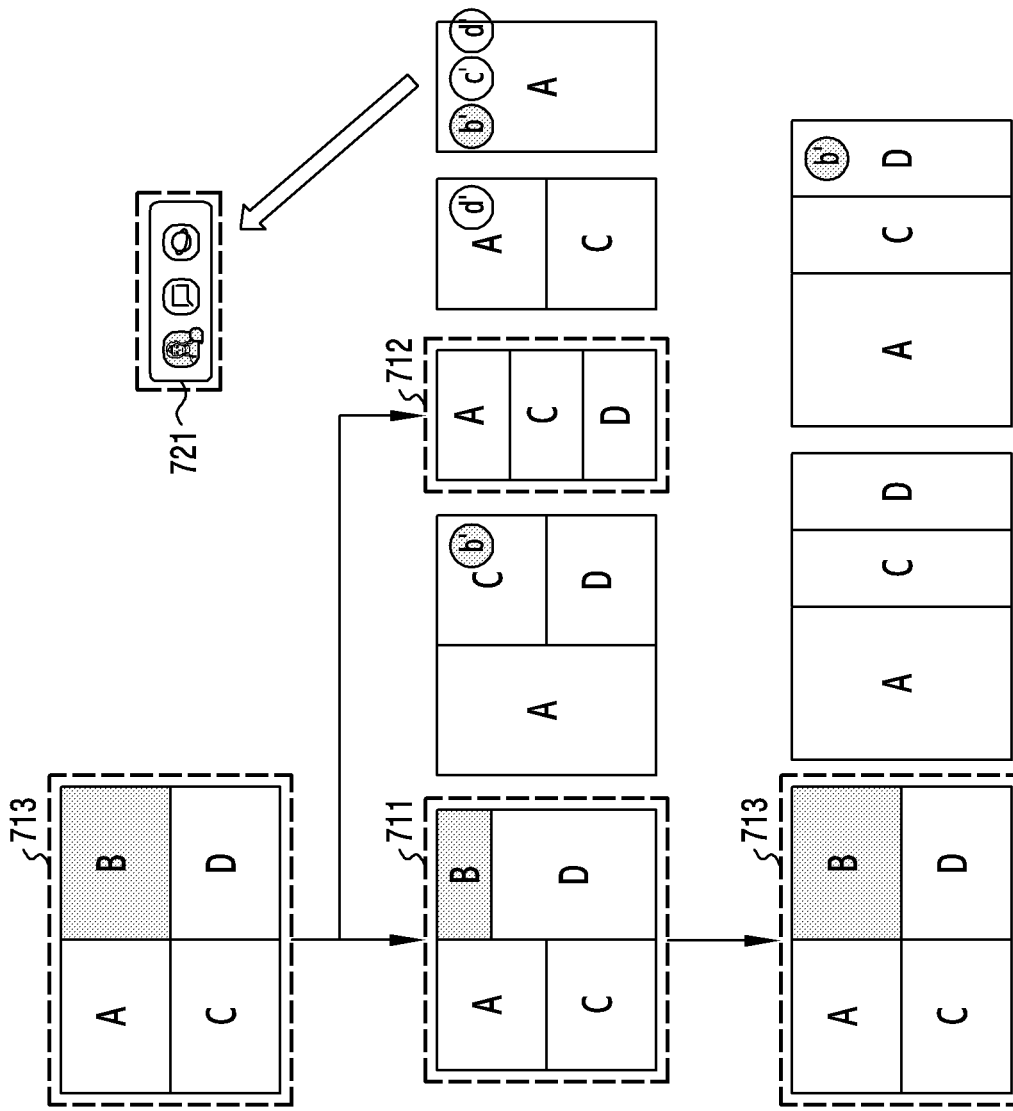
FIG. 7E illustrates a process in which a processor reconfigures multiple execution screens corresponding to multiple applications in response to a change in size of an active area divided into four parts according to an embodiment of the disclosure.

FIG. 7E illustrates a process in which a processor reconfigures multiple execution screens corresponding to multiple applications in response to a change in size of an active area divided into four parts according to an embodiment of the disclosure.

Referring to FIG. 7A, the processor (for example, the processor 210 in FIG. 2) may reconfigure multiple execution screens corresponding to multiple applications in response to a change in size of the flexible display (for example, the flexible display 120 in FIG. 1A), and may display the same in the active area of the flexible display 120. In an embodiment of the disclosure, the active area of the flexible display 120 may have a first size, a second size, and a third size. The third size may be larger than the first size, and the first size may be larger than the second size.

According to an embodiment of the disclosure, the size of the active area of the flexible display 120 may change in operation 700. For example, the second portion (for example, the second portion 122 in FIG. 1A) of the flexible display 120 may be moved out of the housing (for example, the housing 110 in FIG. 1A) and viewed by the user, thereby expanding the size of the active area of the flexible display 120. As another example, the second portion 122 of the flexible display 120 may be moved into the housing 110, thereby reducing the size of the active area of the flexible display 120.

According to an embodiment of the disclosure, the processor (for example, the processor 210 in FIG. 2) may determine whether the size of the active area of the flexible display 120 is reduced in operation 701. For example, as the second portion 122 of the flexible display 120 is moved into the housing 110, a sensor disposed inside the electronic device 100 may identify the inward movement of second portion 122 of the flexible display 120, and the processor 210 may receive a signal from the sensor and determine whether the size of the active area of the flexible display 120 is reduced.

According to an embodiment of the disclosure, the processor 210 may compare the number of execution screens corresponding to multiple applications which can be displayed in the reduced active area of the flexible display 120 with the number of execution screens corresponding to multiple applications which have been displayed in the active area of the flexible display 120 prior to reduction, in operation 702. For example, when the second portion 122 of the flexible display 120 is moved into the housing 110, thereby reducing the active area of the flexible display 120 from a first size to a second size, the active area of the flexible display 120, which has the first size, and which are divided into four parts, may include four areas for displaying execution screens, and the active area of the flexible display 120, which has the second size, and which are divided into two parts, may include two areas for displaying execution screens. The processor 210 may recognize that four section screens corresponding to four areas are currently displayed in the active area having the first size, and that two execution screens corresponding to two areas can be displayed in the active area having the second size. Based thereon, the processor 210 may determine that the number of execution screens currently displayed on the active area having the first size is larger than the number of execution screens which can be displayed in the active area having the second size.

According to an embodiment of the disclosure, when the number of execution screens which have been displayed in the active area prior to reduction is larger than the number of execution screens which can be displayed in the active area prior to reduction, the processor 210 may assign priorities to multiple execution screens corresponding to multiple applications, respectively, in operation 703.

For example, the processor 210 may assign the first priority to the last application selected by the user prior to reduction of the size of the active area, may assign the second priority to a default-mode application execution screen, and may assign the third priority to a low-power mode application execution screen. In an embodiment of the disclosure, the last application selected by the user prior to reduction of the size of the active area may refer to an application having an execution screen on which the user made the last touch input or released the touch input prior to reduction of the size of the active area.

According to an embodiment of the disclosure, the processor 210 may display multiple execution screens in the active area according to the priority assigned to multiple execution screens corresponding to multiple applications in operation 704. For example, the processor 210 may display execution screens corresponding to applications having the first priority assigned thereto in an area of the reduced active area having the second size. When the reduced active area having the second size cannot display all execution screens corresponding to applications having the first priority assigned thereto, the processor 210 may reduce some execution screens and then display the same in the active area, or may display icons instead of the execution screens. The processor 210 may likewise display execution screens corresponding to applications having the second priority assigned thereto and applications having the third priority assigned thereto in the active area.

According to an embodiment of the disclosure, if the size of the active area of the flexible display 120 is expanded from the first size to a third size, the processor 210 may determine whether there is a separate user setting for displaying multiple execution screens corresponding to multiple applications in the active area having the third size in operation 705. In an embodiment of the disclosure, the user setting may refer to the user's designation of execution screens to be displayed in the expanded active area. For example, if the size of the active area is expanded from the first size to the third size, the user may make settings such that default-mode execution screens are solely displayed in the active area having the third size, and low-power mode execution screens which have been reduced and displayed in the active area having the first size are omitted and thus not displayed in the active area having the third size. As another example, the user may make settings such that, instead of the low-power mode execution screens which have been reduced and displayed in the active area having the first size, objects (for example, icons) indicating applications are displayed in the active area having the third size.

According to an embodiment of the disclosure, if the size of the active area of the flexible display 120 is expanded from the first size to the third size, and if there is no separate user setting regarding execution screens to be displayed in the active area having the third size, the processor 210 may display all multiple execution screens displayed in the active area having the first size in the active area having the third size in operation 706.

According to an embodiment of the disclosure, if the size of the active area of the flexible display 120 is expanded from the first size to the third size, and if there is a separate user setting regarding execution screens to be displayed in the active area having the third size, the processor 210 may display multiple execution screens corresponding to multiple applications in the active area according to the user setting in operation 707. For example, if a user setting has been made such that low-power mode execution screens are not separately displayed in the case of expansion of the active area from the first size to the third size, the processor 210 may not display low-power mode execution screens in the active area having the third size in the case of expansion of the active area from the first size to the third size, and may reconfigure the active area with default-mode execution screens only.

As another example, if a user setting has been made such that low-power mode execution screens are to be reduced, or objects indicating applications are displayed instead in the case of expansion of the active area from the first size to the third size, the processor 210 may reduce and display low-power mode execution screens or display icons instead in the case of expansion of the active area from the first size to the third size.

Referring to FIG. 7B, an active area 711 of the flexible display (for example, the flexible display 120 in FIG. 1A) having a first size according to an embodiment may be divided into two parts. Execution screen A of a first application and execution screen B of a second application may be displayed in respective two divided areas. In an embodiment of the disclosure, the active area in which execution screen B of the second application is displayed (or execution screen B) may be changed to a low-power mode by the processor (for example, the processor 210 in FIG. 2).

The active area 711 having the first size according to an embodiment may be reduced to an active area 712 having a second size as a part of the flexible display 120 is moved into the housing (for example, the housing 110 in FIGS. 1A and 1B).

In an embodiment of the disclosure, in response to reduction of the active area 711 having the first size to the active area 712 having the second size, the processor 210 may determine that the number of execution screens which the active area 712 having the second size can display is reduced compared with the active area 711 having the first size.

In an embodiment of the disclosure, the processor 210 may assign the first priority to execution screen A in a default mode, and may assign the second priority to execution screen B in a low-power mode.

In an embodiment of the disclosure, the processor 210 may reduce execution screen B of the second application and display the same in a partial area of execution screen A of the first application, or may display an object indicating the second application instead.

According to an embodiment of the disclosure, the active area 712 having the second size may be again expanded to the active area 711 having the first size as a part of the flexible display 120 is moved out of the housing 110.

In an embodiment of the disclosure, in response to expansion of the active area 712 having the second size to the active area 711 having the first size, the processor 210 may reconfigure execution screen A and execution screen B. For example, reduced execution screen B of the second application may be again expanded and displayed in an area of the active area 711 having the first size. As another example, the processor 210 may expand execution screen A of the first application and display the same in the entire active area 711 having the first size, and may omit execution screen B of the second application. As another example, the processor 210 may expand execution screen A of the first application and display the same in the entire active area 711 having the first size, and may display an icon in an area of execution screen A instead of execution screen B of the second application.

Referring to FIG. 7C, the active area 711 of the flexible display 120 having a first size according to an embodiment may be divided into three parts. Execution screen A of a first application, execution screen B of a second application, and execution screen C of a third application may be displayed in respective three divided areas. In an embodiment of the disclosure, the active area in which execution screen C of the third application is displayed (or execution screen C) may be changed to a low-power mode by the processor 210.

The active area 711 having the first size according to an embodiment may be reduced to an active area 712 having a second size as a part of the flexible display 120 is moved into the housing 110.

In an embodiment of the disclosure, in response to reduction of the active area 711 having the first size to the active area 712 having the second size, the processor 210 may determine that the number of execution screens which the active area 712 having the second size can display is reduced compared with the active area 711 having the first size.

In an embodiment of the disclosure, the processor 210 may assign the first priority to execution screen A and execution screen B in a default mode, and may assign the second priority to execution screen C in a low-power mode.

In an embodiment of the disclosure, the processor 210 may reduce execution screen C of the third application and display the same in a partial area of execution screen A of the first application, or may display an object (for example, an icon) indicating the third application instead in an area of execution area A.

According to an embodiment of the disclosure, the active area 712 having the second size may be again expanded to the active area 711 having the first size as a part of the flexible display 120 is moved out of the housing 110.

In an embodiment of the disclosure, in response to expansion of the active area 712 having the second size to the active area 711 having the first size, the processor 210 may again expand reduced execution screen C of the third application and display the same in an area of the active area 711 having the first size.

In an embodiment of the disclosure, in response to expansion of the active area 712 having the second size to the active area 711 having the first size, the processor 210 may expand execution screen A of the first application and execution screen B of the second application and display the same in an area of the active area 711 having the first size, respectively, and may omit execution screen C of the third application.

In an embodiment of the disclosure, in response to expansion of the active area 712 having the second size to the active area 711 having the first size, the processor 210 may reconfigure execution screen A, execution screen B, and execution screen C. For example, reduced execution screen C of the third application may be again expanded and displayed in an area of the active area 711 having the first size. As another example, the processor 210 may expand execution screen A of the first application and execution screen B of the second application and display the same in an area of the active area 711 having the first size, and may omit execution screen C of the third application. As another example, the processor 210 may expand execution screen A of the first application and execution screen B of the second application and display the same in an area of the active area 711 having the first size, and may display an object indicating the third application in an area of execution screen B instead of execution screen C of the third application.

Referring to FIG. 7D, the active area 711 of the flexible display 120 having a first size according to an embodiment may be divided into three parts. Execution screen A of a first application, execution screen B of a second application, and execution screen C of a third application may be displayed in respective three divided areas. In an embodiment of the disclosure, the active area in which execution screen A of the first application is displayed (or execution screen A) and the active area in which execution screen C of the third application is displayed (or execution screen C) may be changed to a low-power mode by the processor 210.

The active area 711 having the first size according to an embodiment may be reduced to an active area 712 having a second size as a part of the flexible display 120 is moved into the housing 110.

In an embodiment of the disclosure, in response to reduction of the active area 711 having the first size to the active area 712 having the second size, the processor 210 may determine that the number of execution screens which the active area 712 having the second size can display is reduced compared with the active area 711 having the first size.

In an embodiment of the disclosure, the processor 210 may assign the first priority to execution screen B in a default mode, and may assign the second priority to execution screen A and execution screen C in a low-power mode.

In an embodiment of the disclosure, the processor 210 may reduce execution screen A of the first application and execution screen C of the third application and display the same in a partial area of execution screen B of the second application, or may display objects (for example, icons) indicating the applications instead in an area of execution area B.

According to an embodiment of the disclosure, the active area 712 having the second size may be expanded to the active area 711 having the first size as a part of the flexible display 120 is moved out of the housing 110.

In an embodiment of the disclosure, in response to expansion of the active area 712 having the second size to the active area 711 having the first size, the processor 210 may reconfigure execution screen A, execution screen B, and execution screen C. For example, reduced execution screen A of the first application and reduced execution screen C of the third application may be again expanded and displayed in an area of the active area 711 having the first size. As another example, the processor 210 may expand execution screen B of the second application and display the same in the entire area of the active area 711 having the first size, and may omit execution screen A of the first application and execution screen C of the third application. As another example, the processor 210 may expand execution screen B of the second application and display the same in the entire area of the active area 711 having the first size, and may display objects indicating the first and third applications, respectively, in an area of execution B instead of execution screen A of the first application and execution screen C of the third application.

Referring to FIG. 7E, an active area 713 of the flexible display 120 having a third size according to an embodiment may be divided into four parts. Execution screen A of a first application, execution screen B of a second application, execution screen C of a third application, and execution screen D of a fourth application may be displayed in respective four divided areas. In an embodiment of the disclosure, the active area in which execution screen B of the second application is displayed (or execution screen B) may be changed to a low-power mode by the processor 210.

The active area 713 having the third size according to an embodiment may be reduced to an active area 711 having a first size as a part of the flexible display 120 is moved into the housing 110.

In an embodiment of the disclosure, in response to reduction of the active area 713 having the third size to the active area 711 having the first size, the processor 210 may determine that the number of execution screens which the active area 711 having the first size can display is reduced compared with the active area 713 having the third size.

In an embodiment of the disclosure, the processor 210 may assign the first priority to execution screen A of the first application which is the last selected by the user, may assign the second priority to execution screen C and execution screen D in a default mode, and may assign the third priority to execution screen B in a low-power mode.

In an embodiment of the disclosure, in response to reduction of the active area from the third size to the first size, the processor 210 may reduce execution screen B of the second application and display the same in an area of execution screen D of the fourth application, or may display an object (for example, an icon) indicating the second application instead in an area of execution screen D.

The active area 713 having the third size according to an embodiment may be reduced to an active area 712 having a second size as a part of the flexible display 120 is moved into the housing 110.

In an embodiment of the disclosure, in response to reduction of the active area from the third size to the second size, the processor 210 may reconfigure execution screens in the active area having the second size. For example, the processor 210 may display execution screen A, execution screen B, execution screen C, and execution screen D in the active area 712 having the second size and may omit execution screen B in the low-power mode. As another example, the processor 210 may display execution screen A and execution screen C only, and may replace execution screen D with an object (for example, an icon) indicating the fourth application. As another example, the processor 210 may display execution screen A in the entire active area 712 having the second size, and may replace execution screen B, execution screen C, and execution screen D with objects indicating the first, second, and third applications, respectively.

In an embodiment of the disclosure, an object indicating an application may represent the state of the application. For example, taskbars 721 of objects indicating applications may include, from left, objects indicating second, third, and fourth applications, respectively. The second application is in a low-power mode, and the object indicating the second application may be displayed to have relatively low lightness, screen brightness, and screen scan rate value (for example, 30 Hz). The third and fourth applications are in the default mode, and the objects indicating the third and fourth applications may be displayed to have relatively high lightness, screen brightness, and screen scan rate value (for example, 120 Hz or 90 Hz).

According to an embodiment of the disclosure, the active area 711 having the first size may be again expanded to the active area 713 having the third size as a part of the flexible display 120 is moved out of the housing 110.

In an embodiment of the disclosure, in response to expansion of the active area 711 having the first size to the active area 713 having the third size, the processor 210 may reconfigure execution screens. For example, the processor 210 may again expand reduced execution screen B and display the same in an area of the active area 713 having the third size. As another example, the processor 210 may display execution screen A, execution screen C, and execution screen D in an area of the active area 713 having the third size, and may omit execution screen B. As another example, the processor 210 may display execution screen A, execution screen C, and execution screen D in an area of the active area 713 having the third size, and may display an object indicating the second application in an area of execution screen D instead of execution screen B.

In another embodiment of the disclosure, the processor 210 may redispose not only the size of an execution screen but also the position of the execution screen. For example, an active area having a third size may include a first area and a second area, execution screen A of the first application may be displayed in the first area, and execution screen B of the second application may be displayed in the second area. In response to reduction of the active area having the third size to an active area having a first size, the processor 210 may display execution screen B of the second application in the first area having a reduced size, and may display execution screen A of the first application in the second area having a reduced size.

Figure 8A:
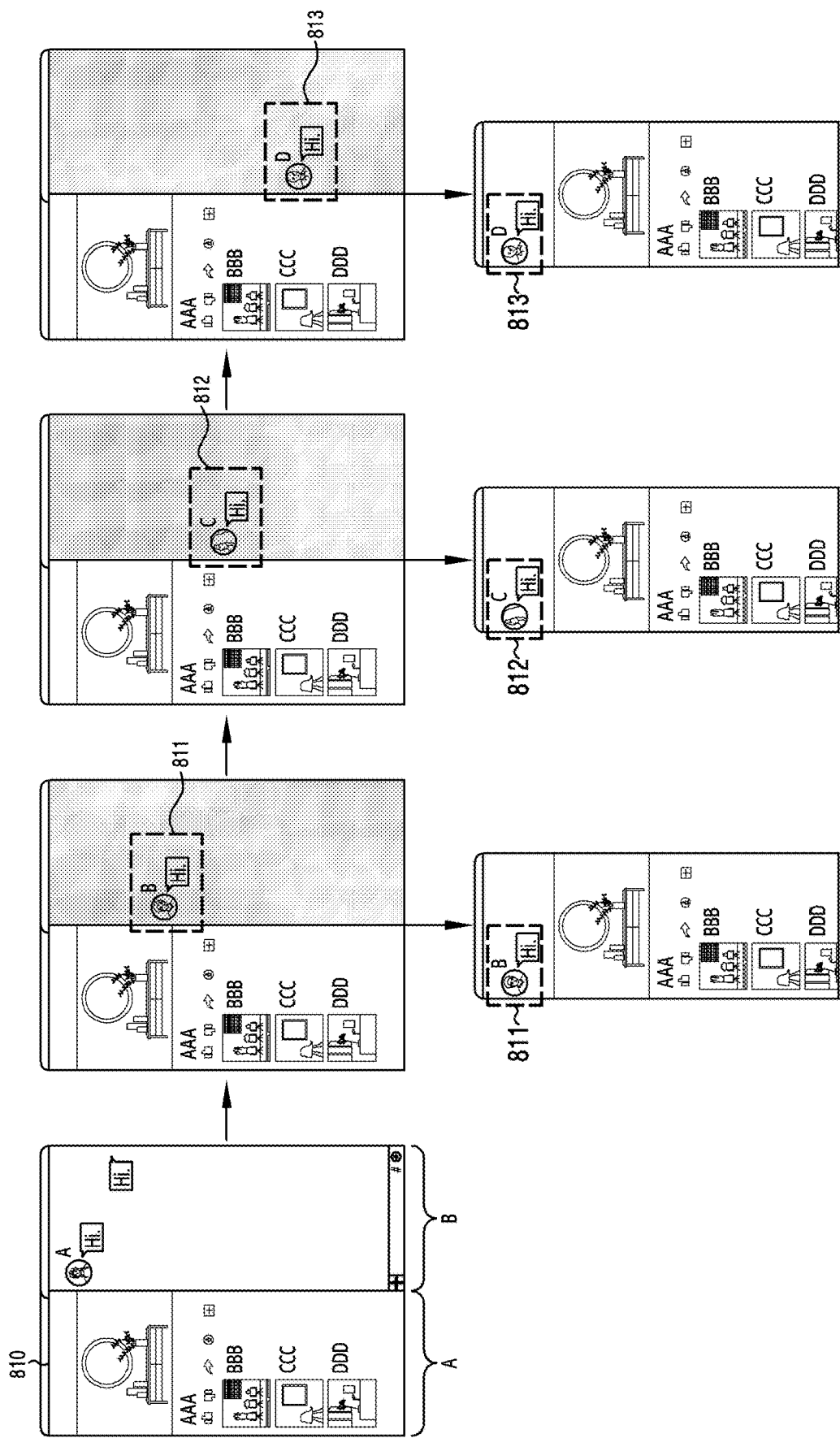
FIG. 8A illustrates an embodiment in which execution screen B displayed in an active area of a flexible display is changed to a lower-power mode, and the screen is reconfigured in response to active area reduction according to an embodiment of the disclosure.

FIG. 8A illustrates an embodiment in which execution screen B displayed in an active area of a flexible display (or the active area in which execution screen B is displayed) is changed to a lower-power mode, and the screen is reconfigured in response to active area reduction according to an embodiment of the disclosure.

Figure 8B:
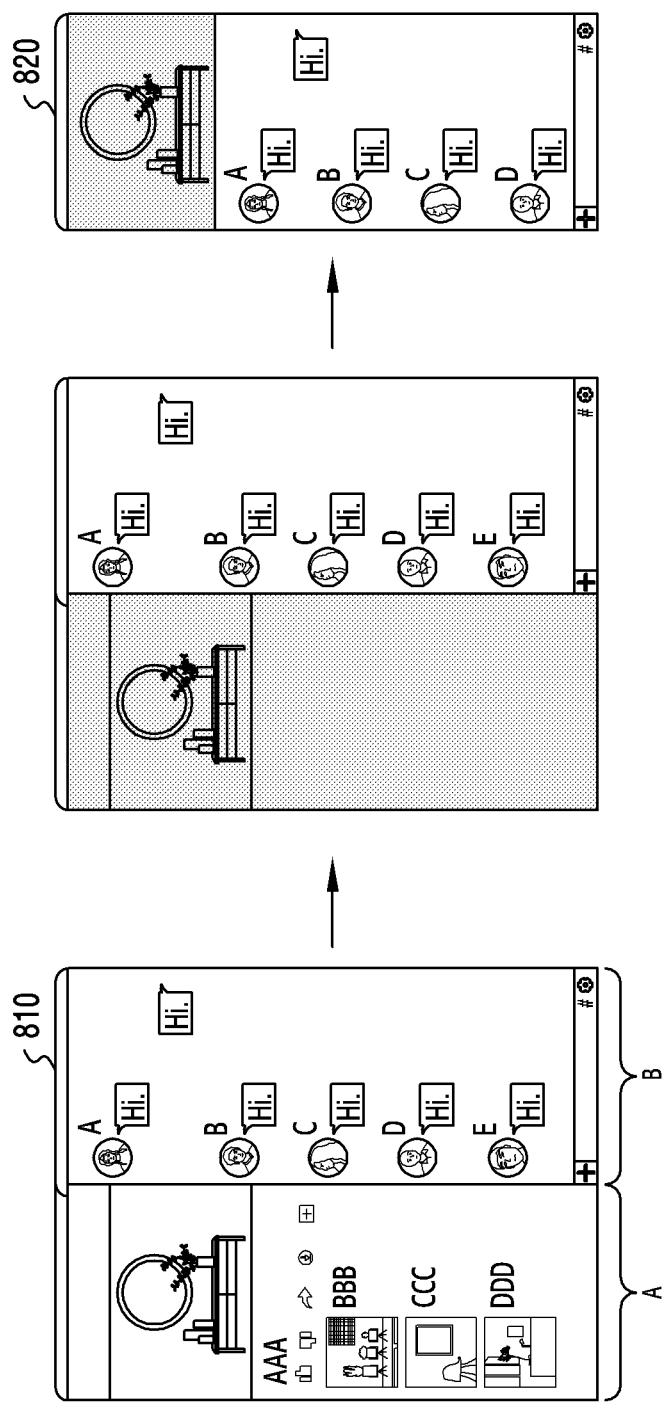
FIG. 8B illustrates an embodiment in which execution screen A displayed in an active area of a flexible display is changed to a lower-power mode, and the screen is reconfigured in response to active area reduction according to an embodiment of the disclosure.

FIG. 8B illustrates an embodiment in which execution screen A displayed in an active area of a flexible display (or the active area in which execution screen A is displayed) is changed to a lower-power mode, and the screen is reconfigured in response to active area reduction according to an embodiment of the disclosure.

Referring to FIG. 8A, execution screen A of a video playback application and execution screen B of a messenger application may be displayed in an active area 810 having a first size according to an embodiment. In an embodiment of the disclosure, the processor (for example, the processor 210 in FIG. 2) may acquire an event resulting from having no user input for a designated time (for example, one minute) with regard to the messenger application, as a pre-defined event in connection with the messenger application. In an embodiment of the disclosure, in response to the event, the processor 210 may change the active area in which execution screen B of the messenger application is displayed (or execution screen B) to a low-power mode.

In an embodiment of the disclosure, the processor 210 may adjust the lightness of the active area of execution screen B switched to the low-power mode (or the lightness of execution screen B) to be lower than execution screen B in a default mode. In an embodiment of the disclosure, the processor 210 may adjust the screen brightness of the active area in which execution screen B switched to the low-power mode is displayed (or the screen brightness of execution screen B) to be lower than execution screen B in the default mode. In an embodiment of the disclosure, the processor 210 may adjust the screen scan rate value (for example, 30 Hz) of the active area in which execution screen B switched to the low-power mode is displayed (or the screen scan rate value of execution screen B) to be lower than the value (for example, 120 Hz) of execution screen B in the default mode. In an embodiment of the disclosure, the processor 210 may output display areas 811, 812, and 813 designated by the messenger application in the active area in which execution screen B switched to the low-power mode is displayed (or on execution screen B). for example, if the active area in which execution screen B is displayed (or if execution screen B) is changed to a low-power mode due to absence of input for a designated time (for example, one minute) since the user has entered "Hi" in the messenger application, the contents of messages received by the electronic device are successively updated, and designated display areas 811, 812, and 813 for displaying the message contents may thus be displayed in the active area in which execution screen B switched to the low-power mode is displayed (or on execution screen B).

According to an embodiment of the disclosure, as the active area 810 having the first size is reduced to an active area 820 having the second size, execution screen B of the messenger application may be reduced and displayed in an area of execution screen A of the video playback application.

Referring to FIG. 8B, the processor 210 according to an embodiment may acquire a pre-defined event corresponding to a case in which there is no user input for a designated time (for example, one minute) since video playback has ended, and in response to the event, may change the active area in which execution screen A is displayed (or execution screen A) to a low-power mode. In an embodiment of the disclosure, as the active area 810 having the first size is reduced to the active area 820 having the second size, execution screen A may be reduced and displayed in an area of execution screen B.

Figure 9:
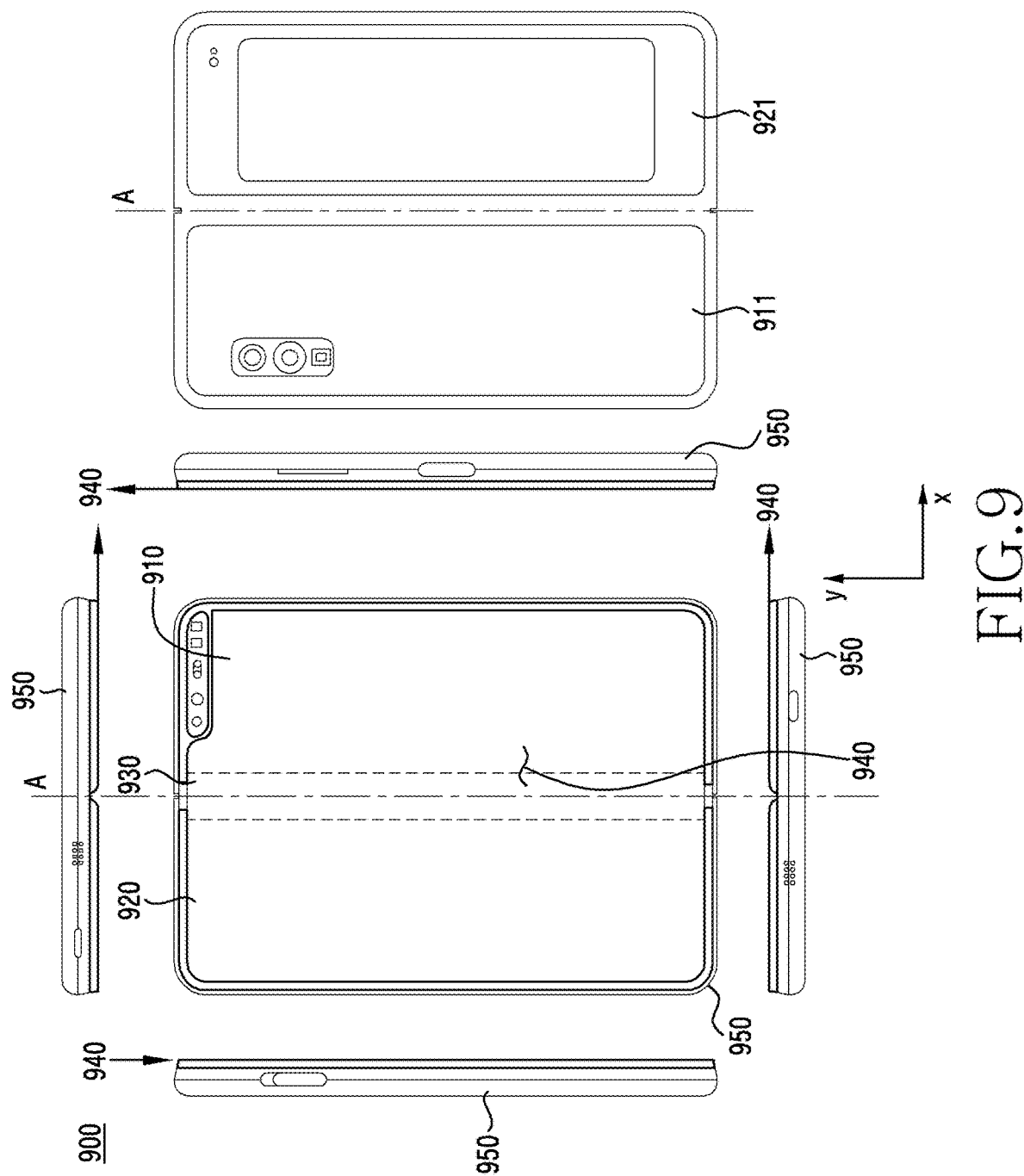
FIG. 9 illustrates an embodiment of a foldable electronic device including a flexible display according to an embodiment of the disclosure.

FIG. 9 illustrates an embodiment of a foldable electronic device including a flexible display according to an embodiment of the disclosure.

Referring to FIG. 9, a foldable electronic device 900 may include a first housing 910, a second housing 920, a connecting member 930, a flexible display 940, and a metal frame 950.

According to an embodiment of the disclosure, the first housing 910 and the second housing 920 may be rotatably connected by the connecting member 930. For example, the connecting member 930 may be a hinge structure including a hinge driving portion.

According to an embodiment of the disclosure, the flexible display 940 may form the front surface of the foldable electronic device 900, and may be disposed across the first housing 910 and the second housing 920. In an example, when the first housing 910 and the second housing 920 are rotated by the connecting member 930 so as to face each other, at least a part of the flexible display 940 may be curved.

According to an embodiment of the disclosure, the rear surface of the first housing 910 may be formed as a first rear cover 911, and the rear surface of the second housing 920 may be formed as a second rear cover 921. In an example, the first rear cover 911 and the second rear cover 921 may protect the first housing 910 and the second housing 920 from external impacts.

According to an embodiment of the disclosure, with regard to the flexible display 940 included in the foldable electronic device 900, a processor (for example, the processor 210 in FIG. 2) may change an execution screen of an application displayed in an area of the flexible display 940 (or the active area in which the execution screen is displayed) to a low-power mode according to the method illustrated in FIG. 3, and may reconfigure execution screens corresponding to multiple applications in response to size expansion and reduction of the active area of the flexible display 940.

Figure 10:
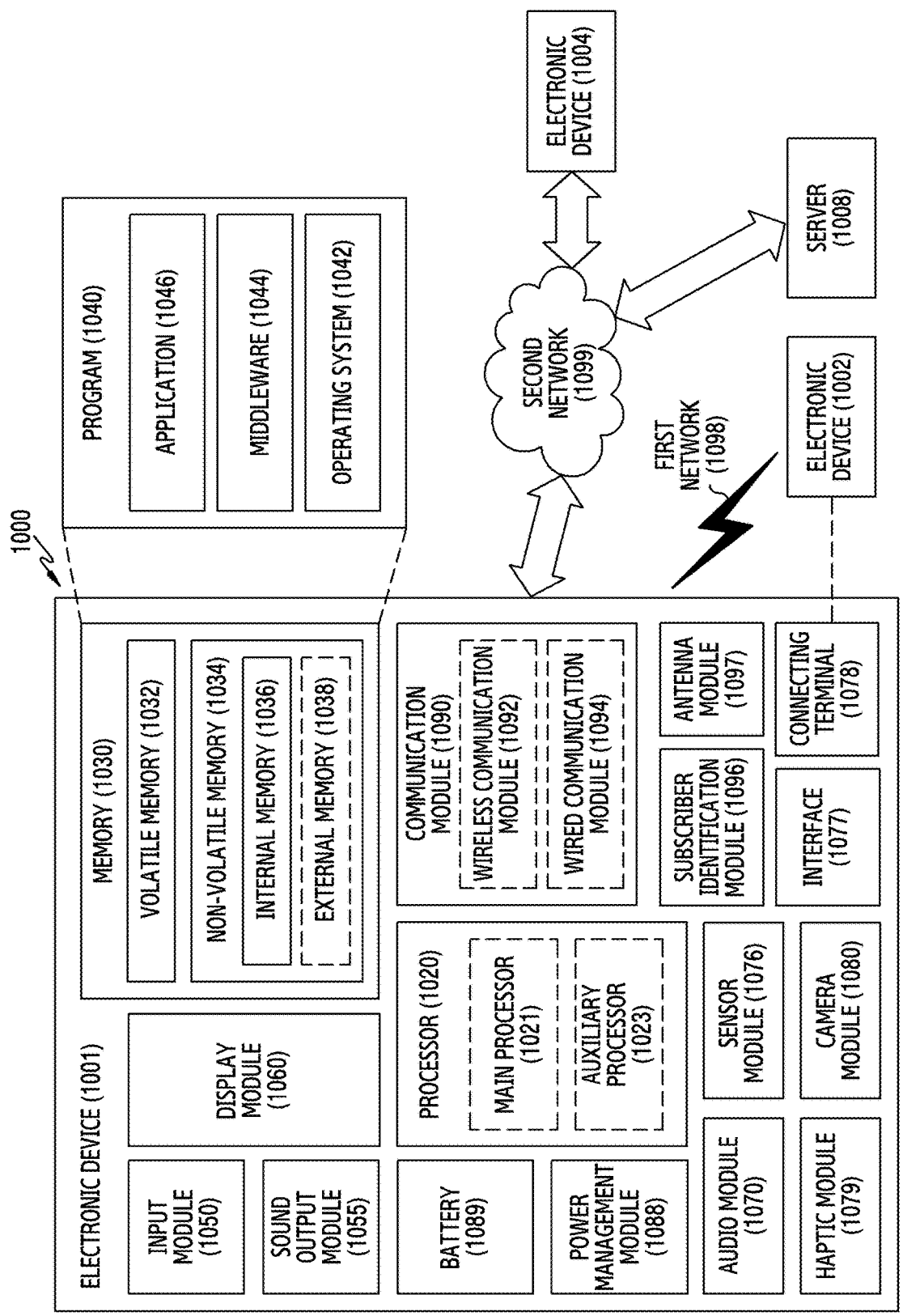
FIG. 10 is a block diagram of an electronic device inside a network environment according to an embodiment of the disclosure.

FIG. 10 is a block diagram illustrating an electronic device 1001 in a network environment 1000 according to an embodiment of the disclosure.

Referring to FIG. 10, the electronic device 1001 in the network environment 1000 may communicate with an external electronic device 1002 via a first network 1098 (e.g., a short-range wireless communication network), or at least one of an external electronic device 1004 or a server 1008 via a second network 1099 (e.g., a long-range wireless communication network). According to an embodiment of the disclosure, the electronic device 1001 may communicate with the external electronic device 1004 via the server 1008. According to an embodiment of the disclosure, the electronic device 1001 may include a processor 1020, a memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments of the disclosure, at least one of the components (e.g., the connecting terminal 1078) may be omitted from the electronic device 1001, or one or more other components may be added in the electronic device 1001. In some embodiments of the disclosure, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment of the disclosure, as at least part of the data processing or computation, the processor 1020 may store a command or data received from another component (e.g., the sensor module 1076 or the communication module 1090) in a volatile memory 1032, process the command or the data stored in the volatile memory 1032, and store resulting data in a non-volatile memory 1034. According to an embodiment of the disclosure, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment of the disclosure, the auxiliary processor 1023 (e.g., an image signal processor or a communication processor) may be implemented as part of another component (e.g., the camera module 1080 or the communication module 1090) functionally related to the auxiliary processor 1023. According to an embodiment of the disclosure, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment of the disclosure, the display module 1060 may include a touch sensor adapted to detect a touch, or a pressure sensor adapted to measure the intensity of force incurred by the touch.

The audio module 1070 may convert a sound into an electrical signal and vice versa. According to an embodiment of the disclosure, the audio module 1070 may obtain the sound via the input module 1050, or output the sound via the sound output module 1055 or a headphone of an external electronic device (e.g., the external electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment of the disclosure, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the external electronic device 1002) directly (e.g., wiredly) or wirelessly. According to an embodiment of the disclosure, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the external electronic device 1002). According to an embodiment of the disclosure, the connecting terminal 1078 may include, for example, a definition multimedia interface (HDMI) connector, a universal serial bus (USB) connector, an SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1079 may include, for example, a motor, a piezoelectric element, or an electric stimulator.

The camera module 1080 may capture a still image or moving images. According to an embodiment of the disclosure, the camera module 1080 may include one or more lenses, image sensors, image signal processors, or flashes.

The power management module 1088 may manage power supplied to the electronic device 1001. According to one embodiment of the disclosure, the power management module 1088 may be implemented as at least part of, for example, a power management integrated circuit (PMIC).

The battery 1089 may supply power to at least one component of the electronic device 1001. According to an embodiment of the disclosure, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the external electronic device 1002, the external electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment of the disclosure, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the millimeter wave (mmWave) band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the external electronic device 1004), or a network system (e.g., the second network 1099). According to an embodiment of the disclosure, the wireless communication module 1092 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment of the disclosure, the antenna module 1097 may include an antenna including a radiating element composed of a conductive material or a conductive pattern formed in or on a substrate (e.g., a printed circuit board (PCB)). According to an embodiment of the disclosure, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment of the disclosure, another component (e.g., a radio frequency integrated circuit (RFIC)) other than the radiating element may be additionally formed as part of the antenna module 1097.

According to various embodiments of the disclosure, the antenna module 1097 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1001 and the external electronic device 1004 via the server 1008 coupled with the second network 1099. Each of the external electronic devices 1002 or 1004 may be a device of a same type as, or a different type, from the electronic device 1001. According to an embodiment of the disclosure, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment of the disclosure, the external electronic device 1004 may include an internet-of-things (IoT) device. The server 1008 may be an intelligent server using machine learning and/or a neural network. According to an embodiment of the disclosure, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

According to an embodiment of the disclosure, an electronic device may include a flexible display and at least one processor operably connected to the flexible display. The at least one processor may display a first execution screen of a first application in a first area of the flexible display, may display a second execution screen of a second application in a second area sharing at least one periphery with the first area of the flexible display, may acquire a pre-defined event associated with the second application, may change the second execution screen of the second application in the second area to a low-power mode, in response to the pre-defined event, while maintaining the first execution screen of the first application in the first area, and may output partial contents selected from the second execution screen of the second application in consideration of at least one of the type and attribute of the second application while the second execution screen is in the low-power mode.

According to an embodiment of the disclosure, the pre-defined event may be defined by a user input.

According to an embodiment of the disclosure, the pre-defined event may occur in a case in which no user input is received for a designated time with regard to the second execution screen of the second application.

The electronic device according to an embodiment may further include an electronic pen and an accommodation groove in which the electronic pen can be mounted. The at least one processor may receive an input of the electronic pen associated with the second application, may detect the electronic pen being inserted into the accommodation groove, and may change the second execution screen of the second application in the second area to the low-power mode, in response to detection of the electronic pen being inserted, while maintaining the first execution screen of the first application in the first area.

The electronic device according to an embodiment may further include an electronic pen and an accommodation groove in which the electronic pen can be mounted. The at least one processor may receive an input of the electronic pen associated with the second application, may detect the electronic pen being separated from the accommodation groove, and may release the second execution screen of the second application from the low-power mode, in response to detection of the electronic pen being separated.

According to an embodiment of the disclosure, the at least one processor may receive a user input to the second execution screen, and may release the second execution screen from the low-power mode in response to the user input.

According to an embodiment of the disclosure, the user input may include a touch input, and the touch input may be started at a first point on the second execution screen and is released at a second point on the second execution screen spaced apart from the first point.

According to an embodiment of the disclosure, the at least one processor may output an object indicating the second application together with the partial contents selected from the second execution screen.

According to an embodiment of the disclosure, the object indicating the second application may include at least one of an icon, a label, and the name of the second application.

According to an embodiment of the disclosure, the at least one processor may adjust the second execution screen in the low-power mode to have screen brightness or saturation lower than the first execution screen.

According to an embodiment of the disclosure, the at least one processor may adjust the second execution screen in the low-power mode to have a screen scan rate lower than the first execution screen.

The electronic device according to an embodiment may be configured such that an active area having a first size, exposed to the outside of the electronic device, includes the first area and the second area. The at least one processor may reduce the second execution screen in response to reduction of the size of the active area of the flexible display from the first size to the second size, and may display the reduced second execution screen in the active area having the second size, or the at least one processor may not display the second execution screen and may display an object indicating the second application in the active area having the second size.

According to an embodiment of the disclosure, the at least one processor may expand the second execution screen reduced and displayed in the active area having the second size in response to increase of the size of the active area from the second size to a third size, and may display the expanded second execution screen in the active area having the third size, or the at least one processor may change the object indicating the second application to the second execution screen and may display the second execution screen in the active area having the third size.

According to an embodiment of the disclosure, in consideration of at least one of the type and attribute of the second application, the at least one processor may determine whether a designated user interface on the second execution screen of the second application exists, may determine whether a designated display area exists on the second execution screen of the second application, and may determine whether an area that changes within a designated time on the second execution screen of the second application exists, and may output the partial contents selected from the second execution screen.

The electronic device according to an embodiment may further include a first housing configured to form a side surface and a rear surface of the electronic device, and a second housing connected to the first housing to be able to slide within a designated range. During a transition from a second state to a first state, the flexible display may be moved into the first housing by sliding of the second housing in the first direction, and during a transition from the first state to the second state, the flexible display may be moved out of the first housing by sliding of the second housing in a second direction opposite to the first direction.

According to an embodiment of the disclosure, an electronic device according to various embodiments of the disclosure may include a flexible display and at least one processor operably connected to the flexible display. The at least one processor may control the flexible display so as to display multiple execution screens corresponding to multiple applications, respectively, in an active area having a first size, which is exposed to the outside of the electronic device, among the flexible display, may compare, in response to reduction of the size of the active area of the flexible display from the first size to a second size, the number of the multiple execution screens currently displayed in the active area having the first size with the number of the multiple execution screens which can be displayed in the active area having the second size, may reduce and display at least one execution screen of at least one application among the multiple applications according to the result of comparison, or may not display the at least one execution screen and may display an object indicating the at least one application in the active area having the second size.

According to an embodiment of the disclosure, the at least one processor may output a first execution screen of a first application among the multiple applications in a first area of the active area, may output a second execution screen of a second application among the multiple applications in a second area of the active area, may acquire a pre-defined event associated with the second application, may change the second execution screen of the second application in the second area to a low-power mode, in response to the pre-defined event, while maintaining the first execution screen of the first application in the first area of the flexible display.

According to an embodiment of the disclosure, the at least one processor may output partial contents selected from the second execution screen of the second application, based on at least one of the type and attribute of the second application, while the second execution screen is in the low-power mode.

According to an embodiment of the disclosure, the at least one processor may output a third execution screen of a third application among the multiple applications, may compare, in response to reduction of the size of the active area of the flexible display from the first size to the second size, the number of the multiple execution screens currently displayed in the active area having the first size with the number of the multiple execution screens which can be displayed in the active area having the second size, may reduce the third execution screen of the third application according to the result of comparison, or may not display the third execution screen and may display an object indicating the third application on the first execution screen.

According to an embodiment of the disclosure, the at least one processor may expand and display the second execution screen reduced and displayed in the first execution screen in response to increase of the size of the active area of the flexible display from the second size to the third size, or may change the object indicting the second application displayed on the first execution screen to the second execution screen.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1040) including one or more instructions that are stored in a storage medium (e.g., an internal memory 1036 or an external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a flexible display; and
at least one processor electrically connected to the flexible display,
wherein the at least one processor is configured to:
display a first execution screen of a first application in a first area of the flexible display,
display a second execution screen of a second application in a second area sharing at least one periphery with the first area of the flexible display,
obtain a pre-defined event associated with the second application,
change the second execution screen of the second application displayed in the second area to a low-power mode, in response to the pre-defined event, while maintaining the first execution screen of the first application in the first area, and
output partial contents selected from the second execution screen of the second application in consideration of at least one of a type or attribute of the second application while the second execution screen is in the low-power mode.

2. The electronic device of claim 1, wherein the pre-defined event is defined by a user input.

3. The electronic device of claim 1, wherein the pre-defined event occurs in case that no user input is received for a designated time with regard to the second execution screen of the second application.

4. The electronic device of claim 1, further comprising:
an electronic pen and an accommodation groove in which the electronic pen can be mounted,
wherein the at least one processor is further configured to:
receive an input of the electronic pen associated with the second application,
detect the electronic pen being inserted into the accommodation groove, and
change the second execution screen of the second application displayed in the second area to the low-power mode, in response to detection of the electronic pen being inserted, while maintaining the first execution screen of the first application in the first area.

5. The electronic device of claim 1, further comprising:
an electronic pen and an accommodation groove in which the electronic pen can be mounted,
wherein the at least one processor is further configured to:
receive an input of the electronic pen associated with the second application,
detect the electronic pen being separated from the accommodation groove, and
release the second execution screen of the second application from the low-power mode, in response to detection of the electronic pen being separated.

6. The electronic device of claim 1, wherein the at least one processor is further configured to:
receive a user input to the second execution screen; and
release the second execution screen from the low-power mode in response to the user input.

7. The electronic device of claim 6,
wherein the user input comprises a touch input,
wherein the touch input is started at a first point on the second execution screen, and
wherein the touch input is released at a second point on the second execution screen spaced apart from the first point.

8. The electronic device of claim 1, wherein the at least one processor is further configured to output an object indicating the second application together with the partial contents selected from the second execution screen.

9. The electronic device of claim 8, wherein the object indicating the second application comprises at least one of an icon, a label, or a name of the second application.

10. The electronic device of claim 1, wherein the at least one processor is further configured to adjust the second execution screen in the low-power mode to have screen brightness or saturation lower than the first execution screen.

11. The electronic device of claim 1, wherein the at least one processor is further configured to adjust the second execution screen in the low-power mode to have a screen scan rate lower than the first execution screen.

12. The electronic device of claim 1,
wherein an active area having a first size, exposed to outside of the electronic device, comprises the first area and the second area, and
wherein, in response to reduction of a size of the active area of the flexible display from the first size to a second size, the at least one processor is further configured to:
reduce the second execution screen,
display the reduced second execution screen in the active area having the second size, or
display an object indicating the second application in the active area having the second size without displaying the second execution screen.

13. The electronic device of claim 12, wherein, in response to increase of a size of the active area from the second size to a third size, the at least one processor is further configured to:
expand the second execution screen reduced and displayed in the active area having the second size;
display the expanded second execution screen in the active area having the third size;
change the object indicating the second application to the second execution screen; and
display the second execution screen in the active area having the third size.

14. The electronic device of claim 1, wherein in consideration of at least one of the type and attribute of the second application, the at least one processor is further configured to:
determine whether a designated user interface exists on the second execution screen of the second application;
determine whether a designated display area exists on the second execution screen of the second application;
determine whether an area that changes within a designated time on the second execution screen of the second application exists; and
output the partial contents selected from the second execution screen.

15. The electronic device of claim 1, further comprising:
a first housing forming a side surface and a rear surface of the electronic device; and a second housing connected to the first housing to be slidable within a designated range, wherein, during a transition from a second state to a first state, the flexible display is moved into the first housing by sliding of the second housing in a first direction, and wherein, during a transition from the first state to the second state, the flexible display is moved out of the first housing by sliding of the second housing in a second direction opposite to the first direction.

16. A method of operating an electronic device comprising a flexible display, the method comprising:

displaying a first execution screen of a first application in a first area of the flexible display, displaying a second execution screen of a second application in a second area sharing at least one periphery with the first area of the flexible display, obtaining a pre-defined event associated with the second application, changing the second execution screen of the second application displayed in the second area to a low-power mode, in response to the pre-defined event, while maintaining the first execution screen of the first application in the first area, and outputting partial contents selected from the second execution screen of the second application in consideration of at least one of a type or attribute of the second application while the second execution screen is in the low-power mode.

17. The method of claim 16, wherein the pre-defined event is defined by a user input.

18. The method of claim 16, wherein the pre-defined event occurs in case that no user input is received for a designated time with regard to the second execution screen of the second application.

19. The method of claim 16, wherein the electronic device further comprises an electronic pen and an accommodation groove in which the electronic pen can be mounted, and wherein the method further comprises:

receiving an input of the electronic pen associated with the second application, detecting the electronic pen being inserted into the accommodation groove, and changing the second execution screen of the second application displayed in the second area to the low-power mode, in response to detection of the electronic pen being inserted, while maintaining the first execution screen of the first application in the first area.

20. The method of claim 16, wherein the electronic device further comprises an electronic pen and an accommodation groove in which the electronic pen can be mounted, and wherein the method further comprises:

receiving an input of the electronic pen associated with the second application, detecting the electronic pen being separated from the accommodation groove, and releasing the second execution screen of the second application from the low-power mode, in response to detection of the electronic pen being separated.

* * * * *